US007676969B2

(12) United States Patent
Davis

(10) Patent No.: US 7,676,969 B2
(45) Date of Patent: Mar. 16, 2010

(54) KINETIC DISPLAY ASSEMBLY

(75) Inventor: Sam Davis, Toronto (CA)

(73) Assignee: Samuel Davis, Toronto, Ontario (CA)

( * ) Notice: Subject to any disclaimer, the term of this patent is extended or adjusted under 35 U.S.C. 154(b) by 313 days.

(21) Appl. No.: 11/767,212

(22) Filed: Jun. 22, 2007

(65) Prior Publication Data

US 2007/0240345 A1 Oct. 18, 2007

Related U.S. Application Data

(63) Continuation-in-part of application No. 11/223,983, filed on Sep. 13, 2005, now Pat. No. 7,356,953.

(51) Int. Cl.

| | |
|---|---|
| ***G09F 19/14*** | (2006.01) |
| ***G09F 1/10*** | (2006.01) |
| ***G09F 1/00*** | (2006.01) |
| ***G09F 1/08*** | (2006.01) |
| ***A45D 19/04*** | (2006.01) |
| ***A47J 47/16*** | (2006.01) |
| ***F16M 11/00*** | (2006.01) |
| ***A47B 97/04*** | (2006.01) |

(52) U.S. Cl. .................... 40/453; 40/124.09; 40/124.16; 40/124.17; 40/124.18; 40/124.19; 40/539; 40/124; 248/459; 248/175; 248/174; 248/460

(58) Field of Classification Search ................... 40/453, 40/539, 124; 248/459, 174, 175, 460
See application file for complete search history.

(56) References Cited

U.S. PATENT DOCUMENTS

| | | | | |
|---|---|---|---|---|
| 1,303,306 | A * | 5/1919 | Heirhaus | 248/459 |
| 3,159,329 | A * | 12/1964 | Hiersteiner | 229/68.1 |
| D224,877 | S | 10/1972 | Fendrick | |
| D271,168 | S | 11/1983 | Antonczyk | |
| 4,422,253 | A * | 12/1983 | Babberl | 40/453 |
| 4,546,019 | A | 10/1985 | Schneider | |
| 4,937,960 | A | 7/1990 | Otake | |
| D316,346 | S | 4/1991 | Jackson et al. | |
| 5,236,365 | A | 8/1993 | Badami | |
| 5,407,718 | A | 4/1995 | Popat et al. | |
| 6,306,479 | B1 | 10/2001 | Feiertag | |
| 7,437,842 | B2 * | 10/2008 | Sgambellone | 40/539 |

OTHER PUBLICATIONS

Canadian Industrial Design Registration No. 44083.
Sheet 2158 from Official Gazette dated Aug. 30, 1983.
Lifestyles Pre Spring 1987 vol. 14 No. 87.

* cited by examiner

*Primary Examiner*—Lesley Morris
*Assistant Examiner*—Syed A Islam
(74) *Attorney, Agent, or Firm*—Bereskin & Parr LLP/S.E.N.C.R.L., s.r.l.

(57) ABSTRACT

A display frame for supporting an image insert for display is provided. The display frame comprises i) an abutment structure for supporting the image insert for display; ii) an upright member including a first connection member and a second connection member; and iii) an interlocking mechanism for interlocking the first connection member and the second connection member. The upright member has a first substantially planar state and a second non-planar display state, and is operable to support the abutment structure. The interlocking mechanism is operable to interlock the first connection member and the second connection member such that the upright member is in the second non-planar display state.

18 Claims, 25 Drawing Sheets

FIGURE 10b
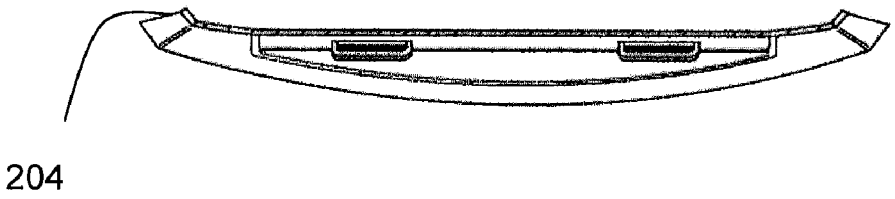
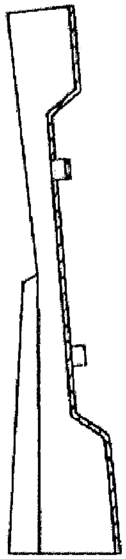
FIGURE 10a
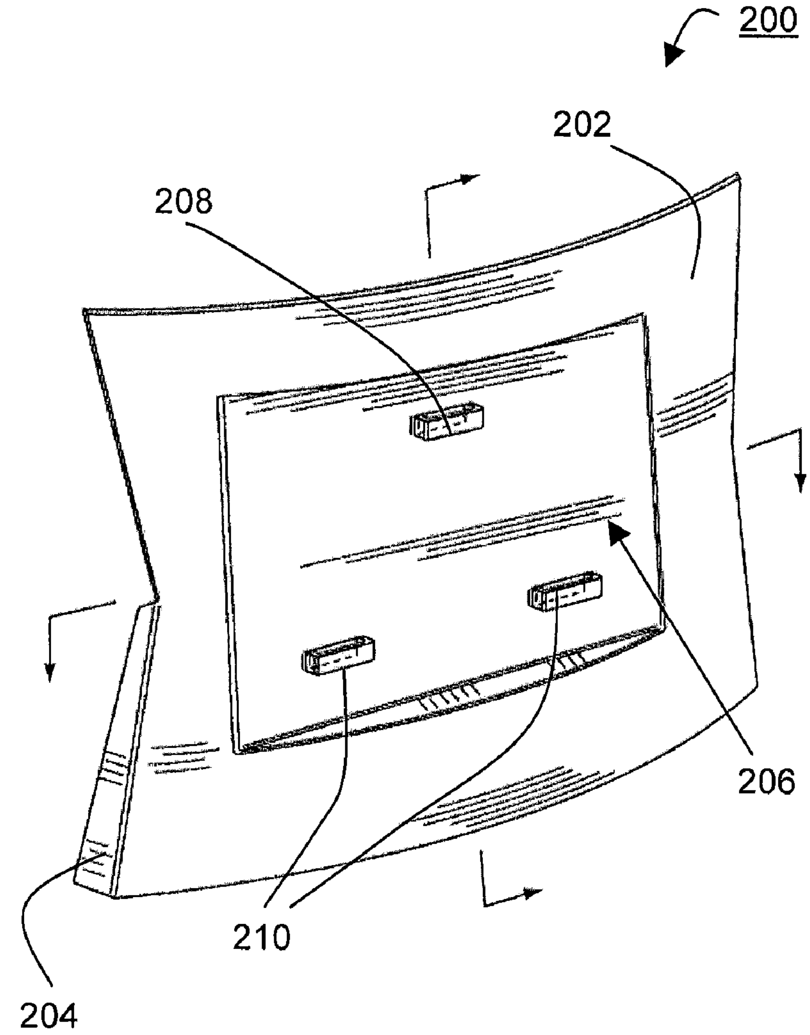
FIGURE 10

KINETIC DISPLAY ASSEMBLY

RELATED APPLICATION

This application is a continuation-in-part of U.S. patent application Ser. No. 11/223,983, filed Sep. 13, 2005, the entire contents of which is hereby incorporated by reference.

FIELD OF THE INVENTION

Embodiments of the invention relate generally to the field of displays for artistic works and more particularly to the display of three-dimensional artworks.

BACKGROUND OF THE INVENTION

Displays that are shaped in a pleated or accordion-style manner can be used to display multiple images, where the image seen by the viewer depends on the position of the viewer. Such artwork images are often called kinetic artwork or kinetic artwork images, and are generally discussed in the U.S. Pat. No. 6,306,479.

SUMMARY OF THE INVENTION

In accordance with an aspect of an embodiment of the present invention, there is provided a display frame for supporting an image insert for display. The display frame comprises i) an abutment structure for supporting the image insert for display; ii) an upright member including a first connection member and a second connection member; and iii) an interlocking mechanism for interlocking the first connection member and the second connection member. The upright member has a first substantially planar state and a second non-planar display state, and is operable to support the abutment structure. The interlocking mechanism is operable to interlock the first connection member and the second connection member such that the upright member is in the second non-planar display state.

In accordance with an aspect of a second embodiment of the present invention. there is provided a product comprising (a) a plurality of pages, each page in the plurality of pages having a spine edge and a free edge opposite to the spine edge; (b) a spine for securing the plurality of pages together, the spine being attached to the spine edge for each page in the plurality of pages; (c) an image insert for displaying a first image; and (d) a display frame for supporting the image insert in a display configuration. The display frame comprises (i) an abutment structure for supporting the image insert for display; (ii) an upright member including a first connection member and a second connection member; and (iii) an interlocking mechanism for interlocking the first connection member and the second connection member. The upright member has a first substantially planar state and a second non-planar display state, and is operable to support the abutment structure. The interlocking mechanism is operable to interlock the first connection member and the second connection member such that the upright member is in the second non-planar display state. Before assembly, the image insert is detachably attached to one of the spine and at least one page in the plurality of pages in the planar configuration; and the display frame is detachably attached to one of the spine and at least one page in the plurality of pages.

BRIEF DESCRIPTION OF THE DRAWINGS

For a better understanding of embodiments of the invention, and to show more clearly how they may be carried into effect, reference will now be made, by way of example, to the accompanying drawings in which:

FIG. 10 is a perspective view of a display frame according to another embodiment of the invention;

FIG. 10*a* is a side view of a section of the display frame of FIG. 10;

FIG. 10*b* is a top view of a section of the display frame of FIG. 10;

DETAILED DESCRIPTION OF THE INVENTION

Aspects of the invention involve a display assembly comprising an image insert, the insert being bendable from a planar configuration to a non-planar, or accordion-like, configuration. The image insert has a number of first and second surfaces for displaying portions of a first image and portions of a second image respectively. The display assembly further comprises a display frame for supporting the image insert in the non-planar configuration. The display frame, in turn, includes an abutment structure for abutting the first and second surfaces to secure the first surfaces at a non-zero angle relative to the second surfaces. The abutment structure resists the image insert unbending and returning to the planar configuration.

In some embodiments, the image insert has a number of fold lines defining alternating first and second surfaces, wherein each of the first surfaces is adjacent to and separated from a second surface by a fold line.

In one embodiment, the abutment structure comprises a pair of curved bands connected to an upright member of the display frame. At least one of the bands has a series of abutments, such as notches or tabs, spaced along the band to secure the image insert to the display frame, and to keep the image insert in its non-planar configuration. Specifically, the notches and tabs are arranged to ensure that the first and second surfaces remain at the non-zero angle relative to each other to ensure optimum viewing for a viewer. In some preferred embodiments, this non-zero angle will be approximately 90 degrees.

Other embodiments of the invention involve a book having a plurality of pages. Each page has a spine edge and at least one free edge. The spine edge is attached to the spine of the book to secure the pages together. An image insert, in a planar configuration, is attached by a spine edge to the spine of the book. A display frame is also attached to the spine of the book using a spine edge. The image insert and display frame are removable to provide a display assembly.

Features of various embodiments of the invention are discussed in greater detail below with reference to the appended figures.

Figure 1:
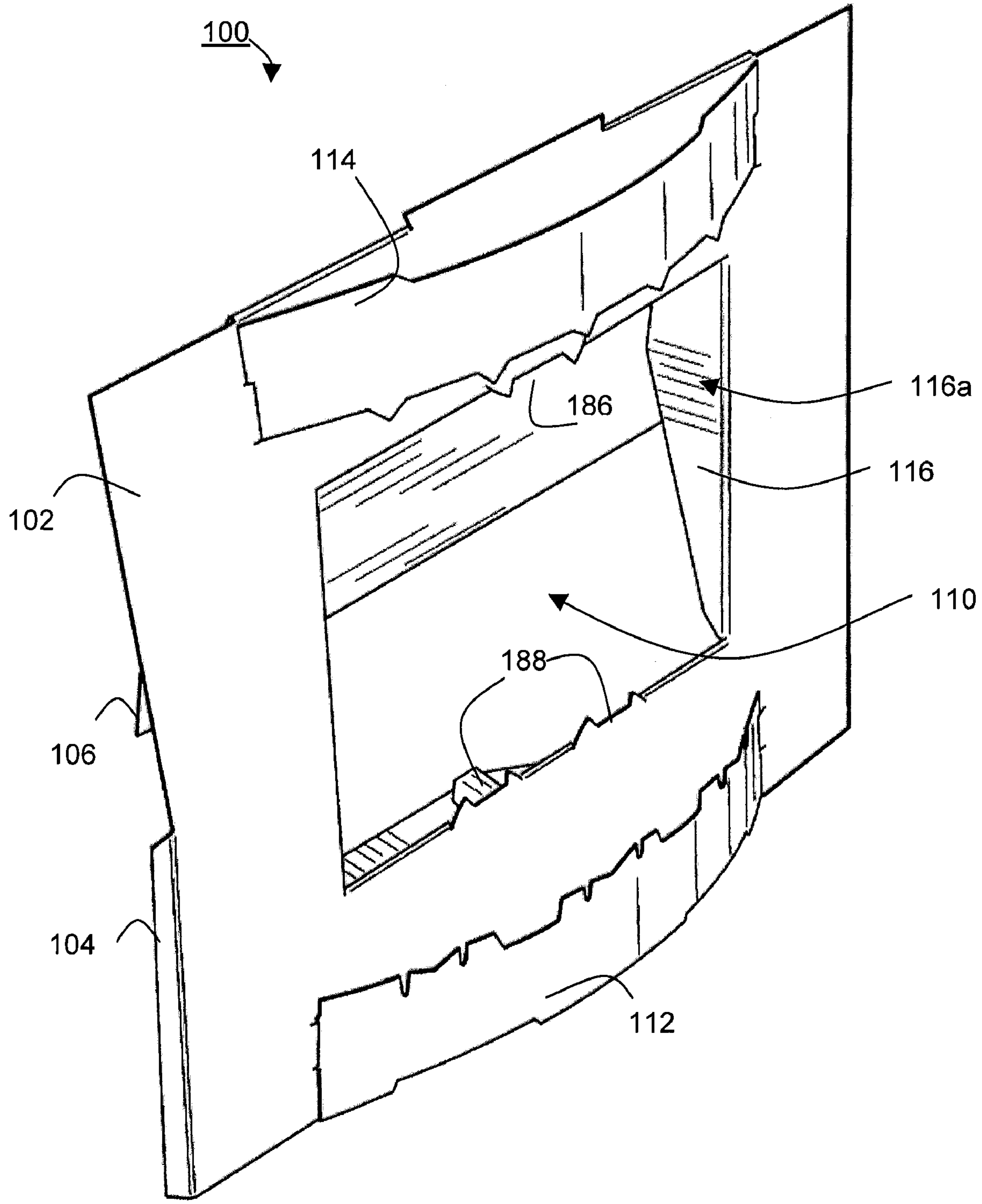
FIG. 1 is a front perspective view of an assembled display frame for use with a kinetic artwork insert according to one embodiment of the invention.
Figure 1A:
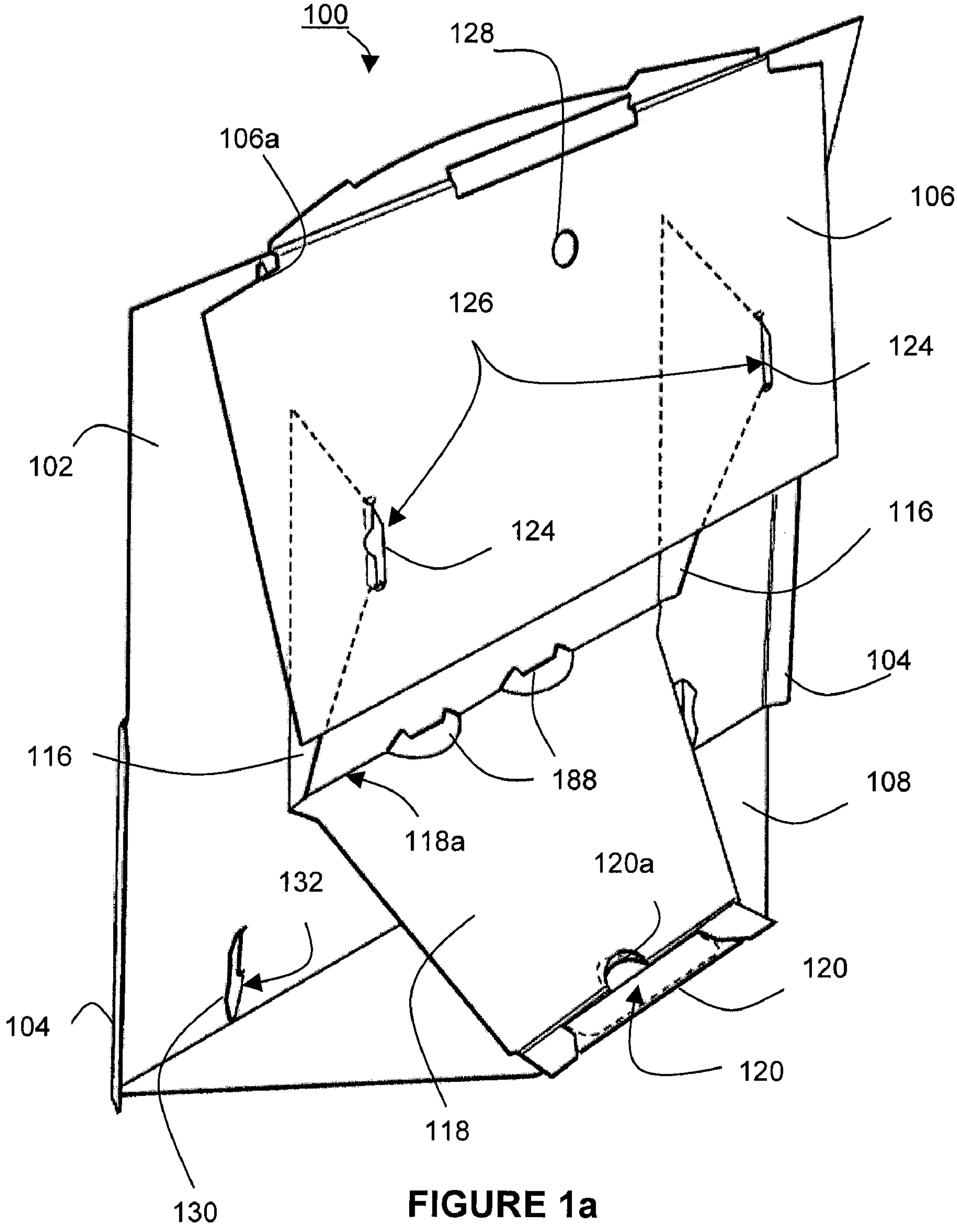
FIG. 1*a* is a rear perspective view of the assembled display frame of FIG. 1.
Figure 2:
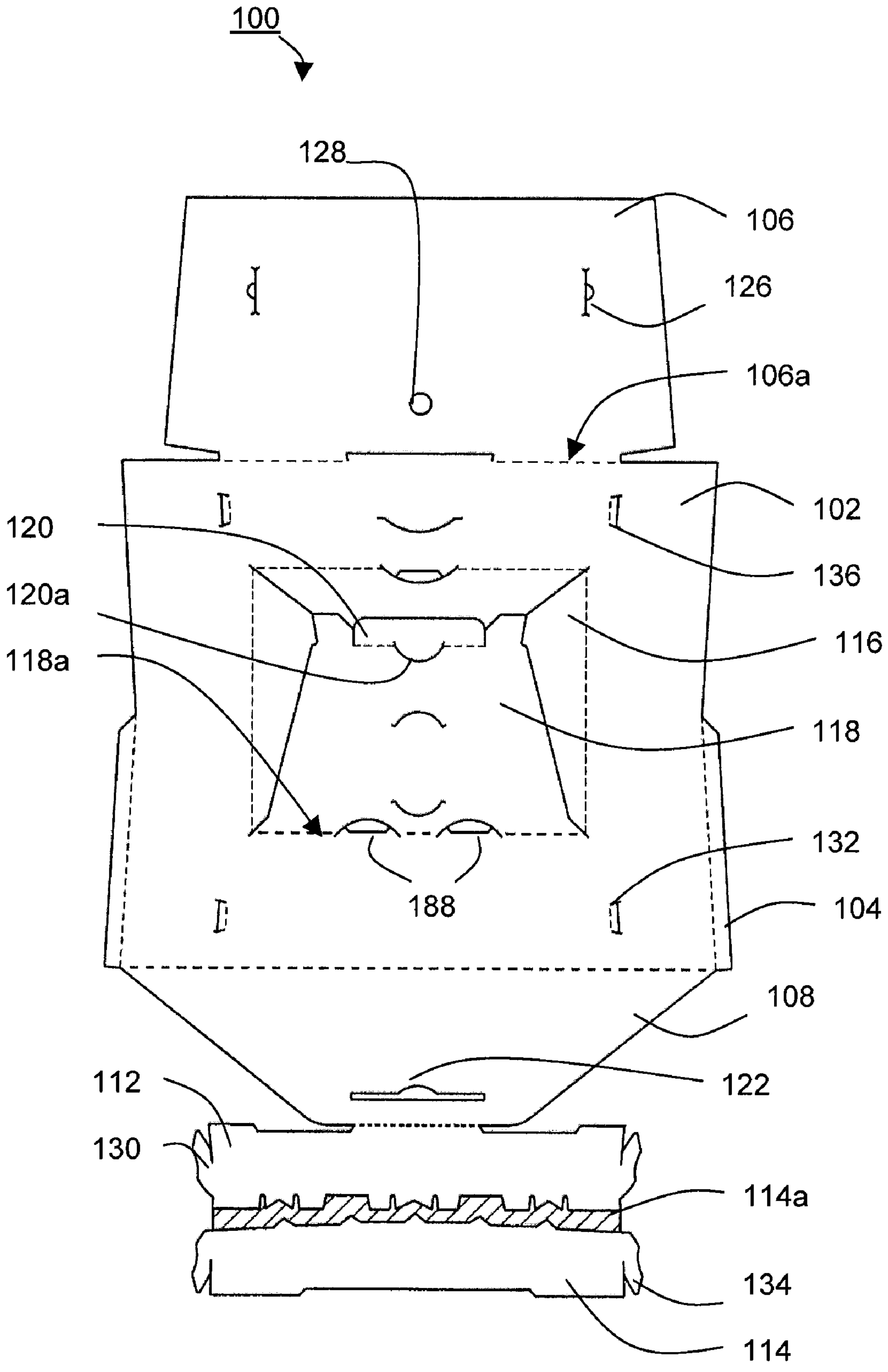
FIG. 2 is a plan view of the unassembled display frame of FIG. 1.

With reference to FIG. 1, FIG. 1*a* and FIG. 2, an assembled display frame 100 comprises an upright member 102 having support fins 104, an upper support 106, a base member 108, and an opening 110 cut through the center of the upright member 102. Two curved abutment bands, lower band 112 and upper band 114, are attached to the upright member 102 at a lower and upper portion respectively. The display frame 100 further comprises center support flaps 116 that fold away from the upright member 102 along fold lines 116*a*, and a rear support flap 118 connected to the upright member 102 along fold line 118*a*.

The base member 108 sits on a ground surface to support and hold the upright member 102 in a substantially vertical position relative to the ground surface. The support fins 104 provide additional support, protruding off the sides of the upright member 102 at a generally non-zero angle and extending vertically to provide additional rigidity to prevent the display frame 100 from tipping. In one preferred embodiment, the angle between the support fins 104 and the upright member 102 is about 45 degrees. In another embodiment, this angle is approximately 90 degrees.

The rear support flap 118 provides additional support for spacing the upright member 102 from the base member 108. When assembled, the rear support flap 118 is engaged with the base member 108 by a tab 120 fitted into a keyhole 122 in base member 108. The base member 108 and rear support flap 118 form a generally triangular shape with the upright member 102 to space the upright member 102 from the base member 108.

The upper support 106 provides additional rigidity to the upright member 102. The upper support 106 is attached to the upright member 102 at fold edge 106*a*, and is supported by the center support flaps 116 by engagement of tabs 124 with slots 126, providing increased rigidity. The upper support flap 106 may also contain a mounting hole 128 which can be used to mount the display frame 100 on a vertical surface, for example by placing a hook through the mounting hole 128.

Images, for example those images complementing the kinetic artwork insert, advertising images, or a calendar, may be printed on one or more portions of the display frame such as the upright member 102, the rear support member 118 and the upper support 106. In this fashion, the display frame 100 may be made more aesthetically pleasing to the viewer, or can be used for a secondary purpose, for example, by displaying a calendar on the upright member 102.

Figure 3:
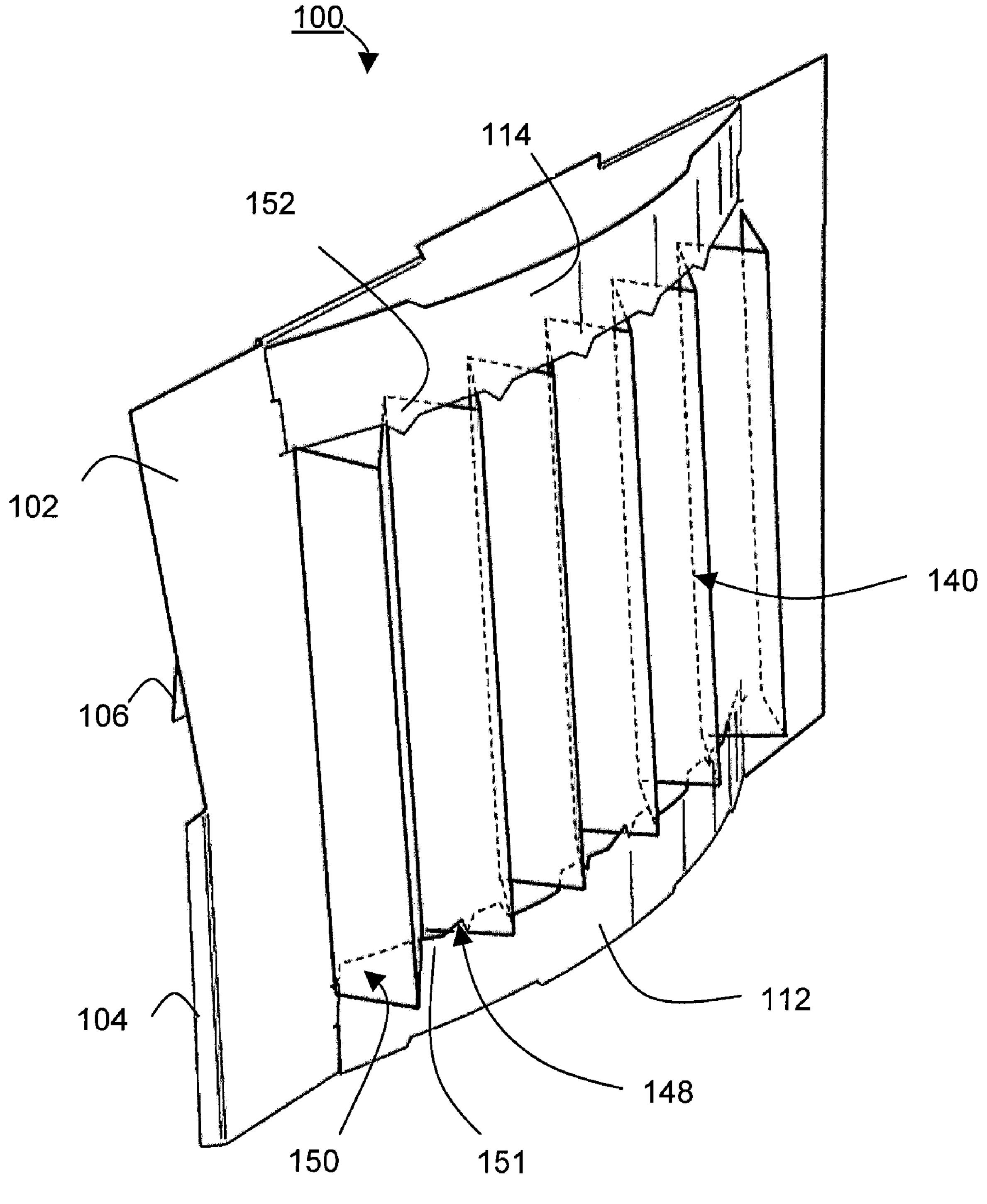
FIG. 3 is a perspective view of the assembled display frame of FIG. 1 with the kinetic artwork insert of FIG. 2*a;*

As shown, the lower band 112 and upper band 114 are contoured and curve outwards somewhat from the plane of the upright member 102. The lower band 112 provides a lower mount for the kinetic artwork insert 140 (as shown in FIG. 3). The lower band 112 is joined to upright member 102 by inserting tabs 130 into slots 132 in the upright member 102. The lower band 112 preferably contacts the ground surface, helping to support the upright member 102 in its substantially vertical position. The upper band 114 is similarly connected to the upright member 102 using tabs 134 engaged with slots 136 (shown in detail in FIG. 5) to provide an upper mount for the kinetic artwork insert 140.

The opening 110 in the upright member 102 allows for ambient light to pass through the display frame 100, to create a halo effect around the kinetic artwork insert 140, highlighting the images. Alternatively, in some embodiments an electric light or a candle may be mounted on or to the rear support flap 118 or base member to provide additional illumination through the opening 110. In some embodiments, a sound chip may be mounted to the base member 108 to provide music, speech or other sound-based accompaniment while viewing the image.

The display frame 100 is made from a resilient planar material, such as a thin sheet of cardboard. In some embodiments, the display frame can be made from materials such as plastic or foam sheet, cardstock, heavy paper or other suitably resilient materials. In one preferred embodiment, the display frame is made from a 20-point SBS cardboard.

With specific reference to FIG. 2, the display frame 100 is visible in a planar configuration before assembly. As shown, the lower band 112 and upper band 114 are initially joined to the display frame 100. The lower band 112 and upper band 114 are held together by a removable connecting piece 114*a*, and are connected to the base member 108 at a tear-off connection 112*a*. To assemble the display frame 100, the lower band 112 and upper band 114 are detached from the base member 108 by tearing along the tear-off connection 112*a*.

The connecting piece 114*a* is removed, and the lower band 112 and upper band 114 can then be inserted into the upright member 102.

Figure 2A:
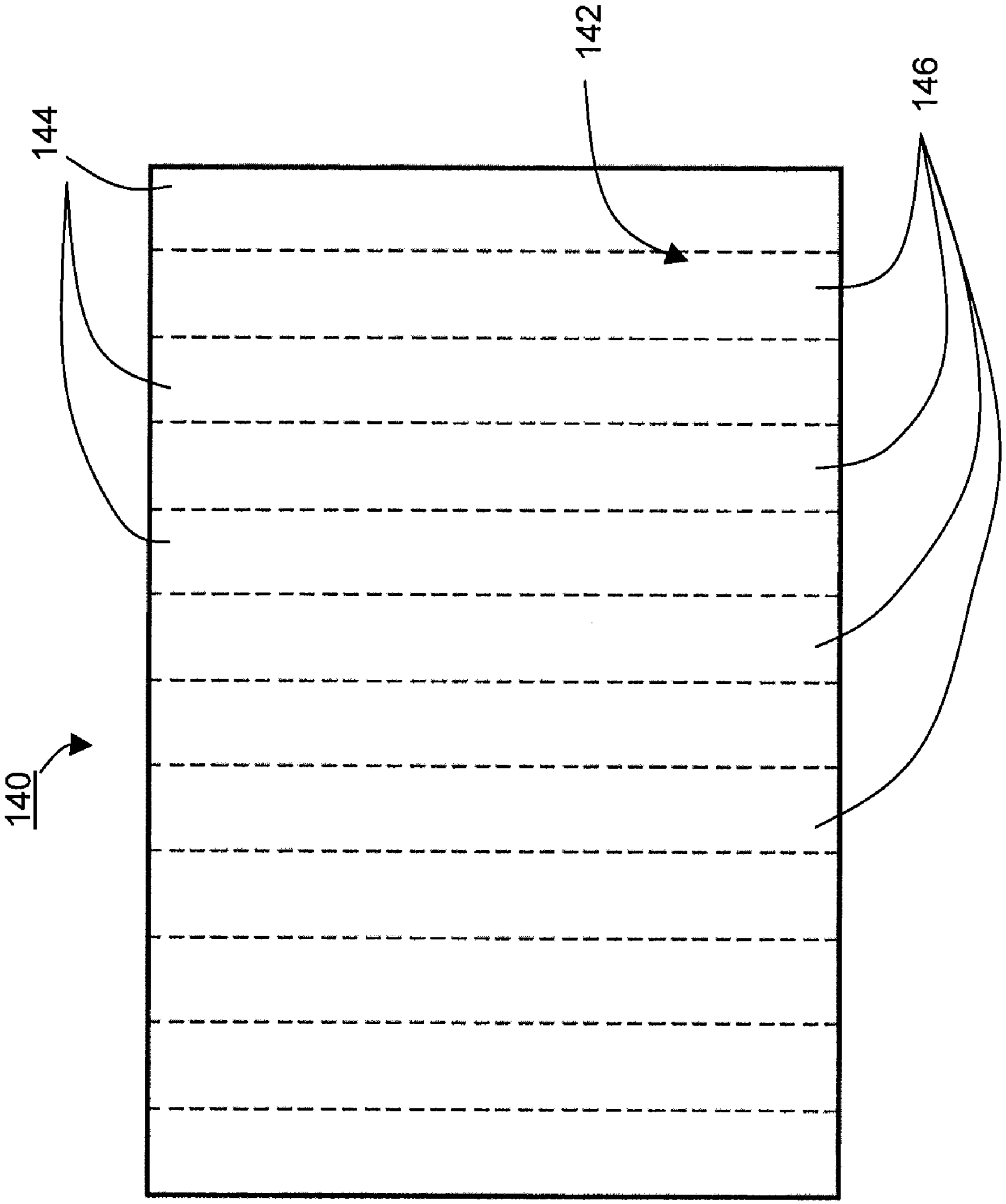
FIG. 2*a* is a plan view of a kinetic artwork insert in a planar configuration for use with the display frame of FIG. 1.

Turning now to FIG. 2*a*, the kinetic artwork insert 140 is shown in its planar configuration as a thin, rectangular section of a resilient material. The kinetic artwork insert 140 has a series of fold lines 142; folding along the fold lines 142 gives the kinetic artwork insert 140 its distinctive accordion-style or non-planar display configuration. In some embodiments, one or more of the fold lines 142 may include perforations to provide for easier folding. In other embodiments, the fold lines may simply be scored without perforating the material.

The kinetic artwork insert 140 comprises a series of alternating first image surfaces 144 and second image surfaces 146. The first image surfaces 144 comprise sections or strips from a first image, and the second image surfaces 146 comprise sections or strips from a second image. When the kinetic artwork insert 140 is folded into its non-planar display configuration, an observer will observe what appears to be the first image when viewing from a first location, and will observe what appears to be the second image when viewing from a second location.

In some embodiments, the kinetic artwork insert 140 is made of a material such as cardboard, cardstock or paper. In one preferred embodiment, the cardboard is 10-point SBS cardboard. In another preferred embodiment, the cardboard is 12-point SBS cardboard.

In some embodiments, the kinetic artwork insert 140 is pre-printed with an images, such that the sections from the first and second images are printed onto the corresponding first image surfaces 144 and second image surfaces 146 respectively. In other embodiments, the kinetic artwork insert 140 may be blank, and a user can populate the image surfaces 144, 146 using pre-cut or 'kiss-cut' stickers shaped to match the image surfaces 144, 146. In some embodiments, sheet of stickers may have the first and second images pre-printed thereon. In other embodiments, the sheet of stickers may be blank, and the user may draw, paint, or print first and second images onto the stickers before placing them onto the kinetic artwork insert 140. For example, the stickers may be provided on a 'kiss-cut' photo-paper, which can used to print first and second images using a standard inkjet printer, and then placed onto the kinetic artwork insert 140, maintaining the order of the strips so that the first and second images maintain the proper viewing relationship.

Figure 2B:
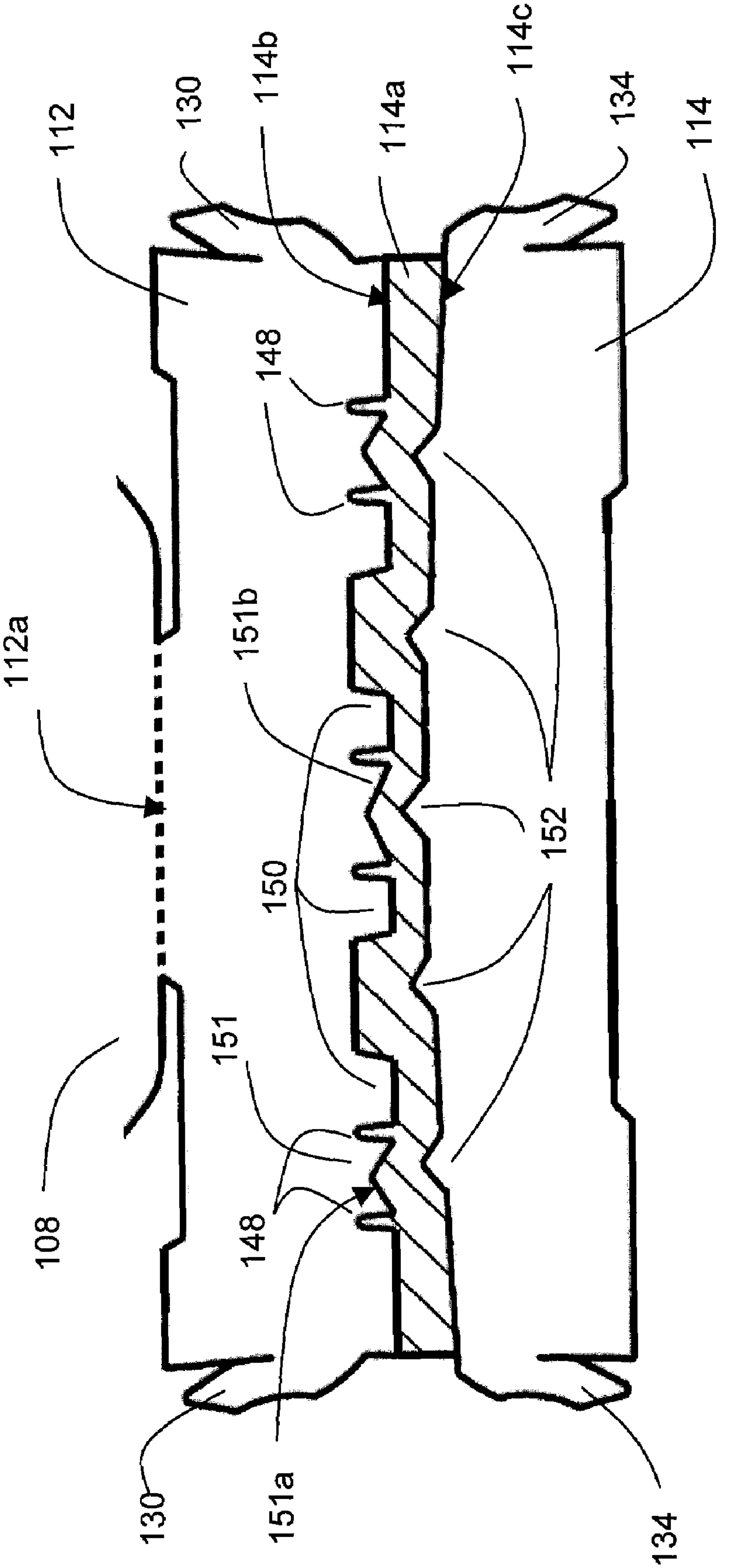
FIG. 2*b* is a plan view of a portion of the display frame of FIG. 2 showing two band members.

Turning now to FIG. 2*b*, the upper band 114 and the lower band 112 from FIG. 2 are shown in greater detail. The upper band 114 and the lower band 112 are joined by the connecting piece 114*a* along tear lines 114*b* and 114*c*. The lower band 112 is also connected to the base member 108 of the display frame 100 at the tear off-connection 112*a*. As discussed above, the upper and lower bands 112, 114 must be torn away from the base member 108 of the display frame 100 at the tear-off connection 112*a*, and the connecting piece 114*a* removed, before the lower band 112 and upper band 114 can be mounted to the upright member 102.

The tabs 130 on the lower band 112 and the tabs 134 on the upper band 114 can be seen in greater detail in FIG. 2*b*, and are shaped to engage with the slots 132 and 136 on the upright member 102. The lower band 112 also comprises a plurality of notches 148, rear tabs 150 and front tabs 151. The notches 148, rear tabs 150 and front tabs 151 are shaped and spaced along the lower band 112 to engage and secure the lower edge of the kinetic artwork insert 140 during assembly, and to ensure it maintains its non-planar or accordion-style shape, while staying flush with the upright member 102. Specifically, vertical sections of the kinetic artwork insert 140 are inserted into the notches 148, while the rear tabs 150 support from the rear of the kinetic artwork insert 140 and the front tabs 151 support from the front of the kinetic artwork insert 140. In the preferred embodiment, the notches 148 are generally U-shaped with walls that accommodate kinetic artwork inserts 140 of different thicknesses, or engage multiple kinetic artwork inserts 140 concurrently. The front tabs 151 may have v-shaped grooves 151*a* cut out to provide improved viewing of the kinetic artwork insert 140 when mounted on the display frame 100, and to improve the aesthetic appearance of the display frame 100.

The upper band 114 optionally has teeth members 152 for engaging with and securing an upper edge of the kinetic artwork insert 140 to the display frame 100. The teeth members 152 on the upper band 114 are sized and spaced to secure the kinetic artwork insert 140 to the display frame, and to help the kinetic artwork insert 140 maintain its non-planar display configuration when inserted into the display frame 100.

Figure 4:
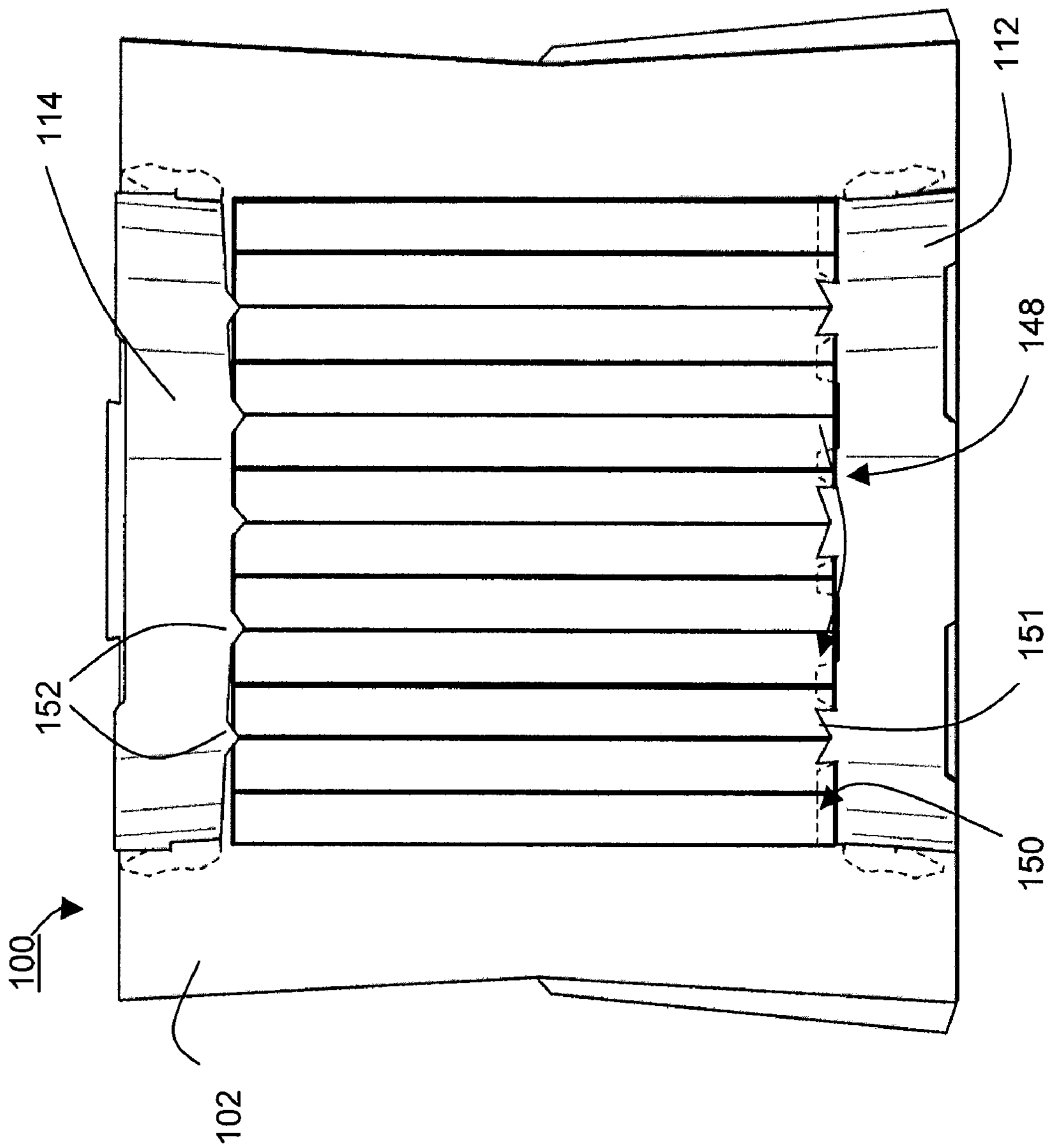
FIG. 4 is a front view of the assembled display frame and the kinetic artwork insert of FIG. 3.
Figure 4A:
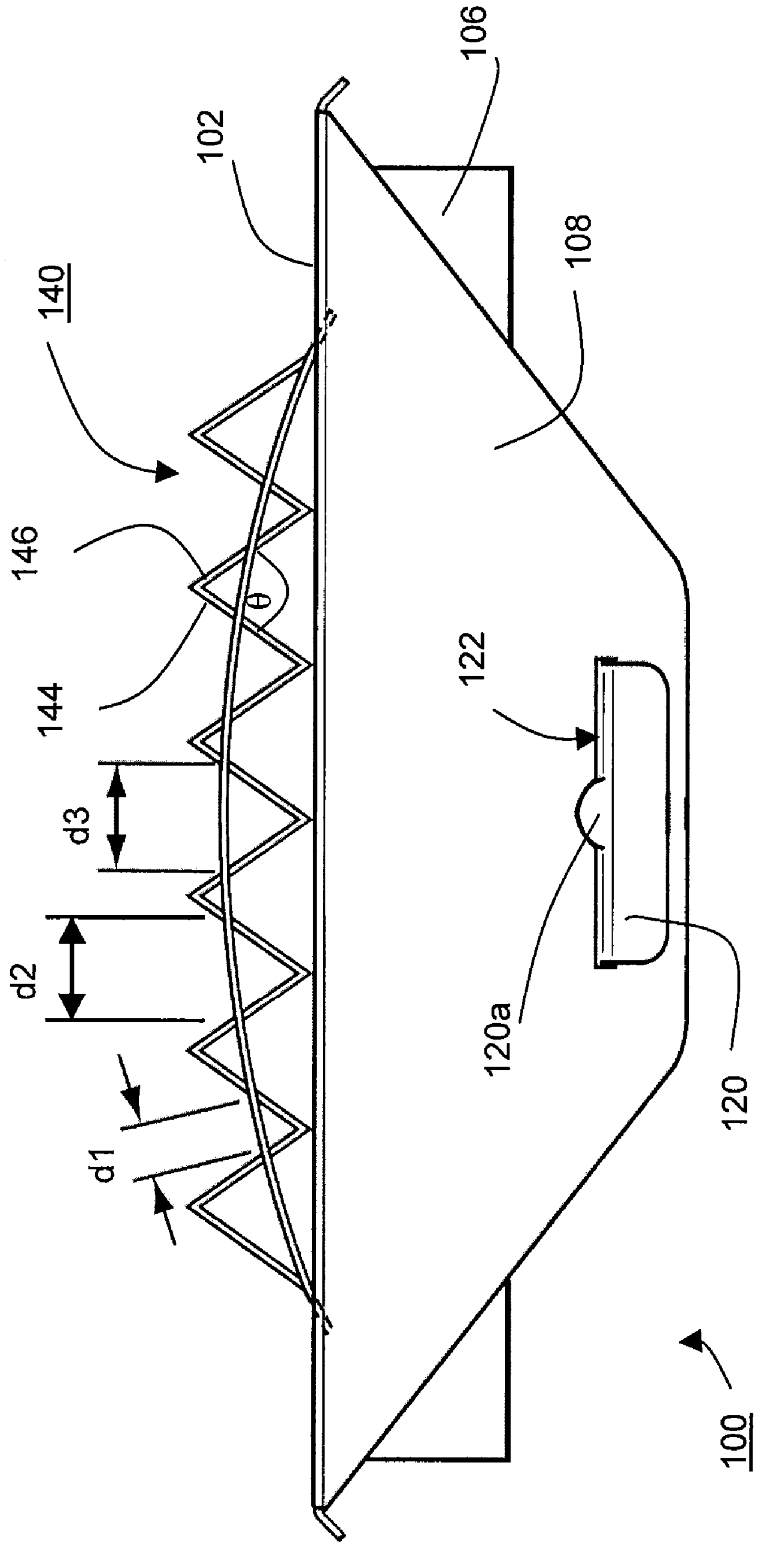
FIG. 4*a* is a bottom view of the assembled display frame and the kinetic artwork insert of FIG. 3.

Turning now to FIG. 3, FIG. 4 and FIG. 4*a*, the display frame 100 is shown assembled with kinetic artwork insert 140 in its non-planar display configuration. The kinetic artwork insert 140 sits in the notches 148 on the lower band 112, and is secured in place by the front tabs 151 which are visible and shown in solid lines, and the rear tabs 150, which are hidden and are shown in dashed lines. The teeth members 152 on the upper band 114 are shown engaged with the folds in the kinetic artwork insert 140.

In FIG. 4*a*, the position of the kinetic artwork insert 140 with respect to the lower band 112 is shown in detail. The first image surfaces 144 and the second image surfaces 146 are oriented at angle θ relative to each other. In a preferred embodiment, the angle θ between the first image surface 144 and the second image surface 146 is approximately 90 degrees to provide optimum viewing of the first and second images.

It is also desirable that the kinetic artwork insert 140 stay flush against the upright member 102 and not follow the curve of the lower band 112, as this ensures a better quality of image to the observer. It is also desirable that the angle θ be optimized for viewing. This is accomplished by properly selecting the size and spacing of the notches 148, the rear tabs 150 and front tabs 151 on the lower band 112. For example, with reference to FIGS. 4 and 4*a*, a first front tab 151*a* would have spacing 'd1' as shown at one end of the lower band 112, and a second front tab 151*b* would have spacing 'd3' as shown at the centre of the lower band 112. A third intermediate spacing is shown as 'd2'. Generally, 'd2' is slightly larger than 'd1', and 'd3' is slightly larger than 'd2', helping the kinetic artwork insert 140 to stay flush to the upright member 102 while accommodating the curvature of the lower band 112. It will be appreciated by those skilled in the art that the particular sizes and spacing of 'd1', 'd2' and 'd3' will depend upon the curvature of the lower band 112, as well as the particular size and shape of the kinetic artwork insert 140.

FIG. 4*a* also clearly shows the tab 120 of the rear support flap 118 engaged with the keyhole 122 of the base member 108, securing the rear support flap 118 to the base member 108. In some embodiments, such as the embodiment shown in FIG. 4*a*, a secondary tab 120*a* may be used to help secure the tab 120 to the base member 108. The tabs 120 and 120*a* project in opposite directions against the base member 108 thereby reducing the chance of inadvertent removal of tabs 120 and 120*a* from the keyhole 122.

Figure 5:
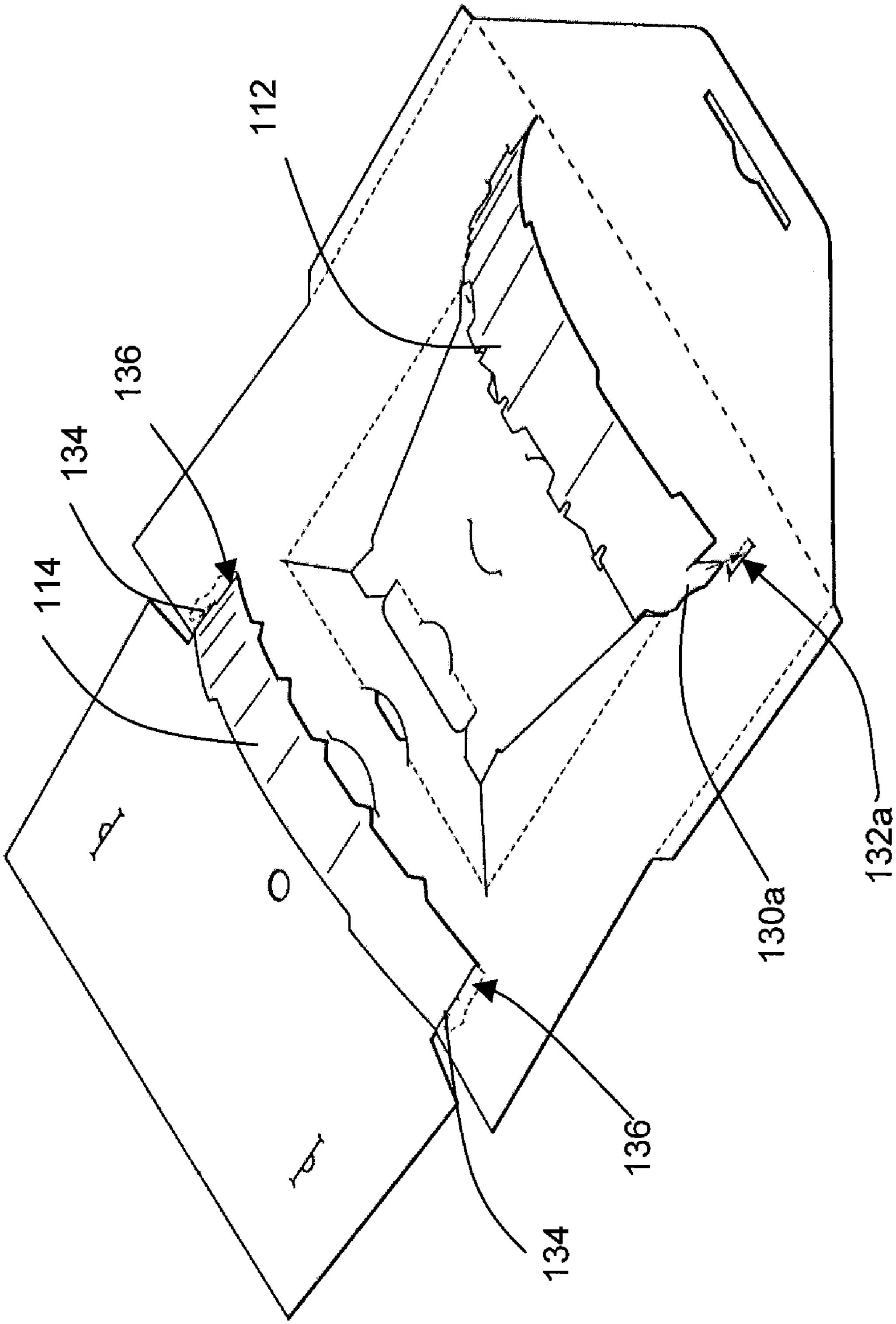
FIG. 5 is a perspective view of the display frame of FIG. 1 shown partially assembled.

In FIG. 5, the tabs 134 of the upper band 114 have been inserted into the slots 136 on the upright member 102, securing the upper band 114 to the upright member 102. The lower band 112 is partially secured to the upright member 120, and tab 130*a* is being inserted into slot 132*a* to completely secure the lower band 112 in place.

Figure 6:
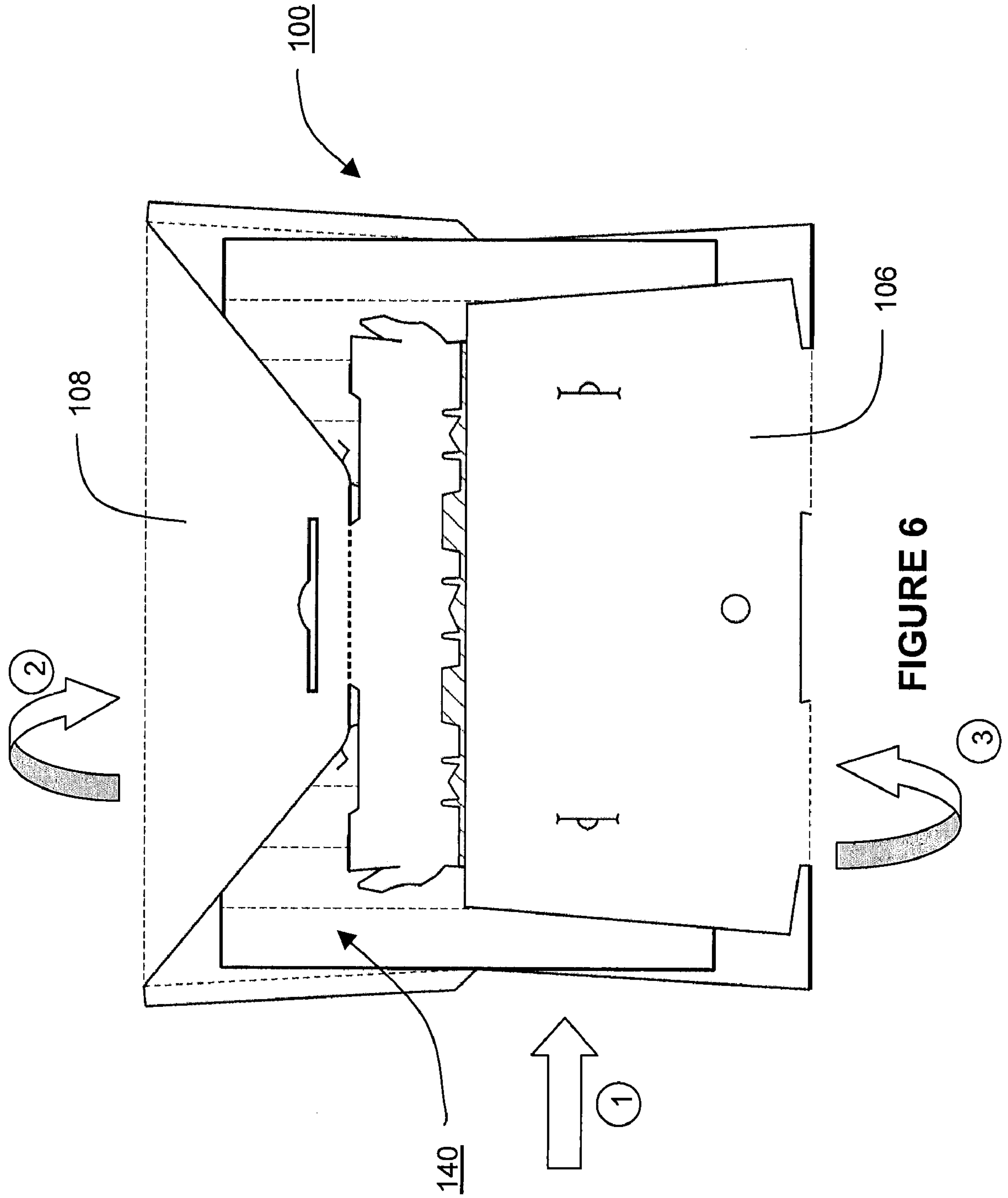
FIG. 6 is a plan view of an unassembled display frame with a kinetic artwork insert according to one embodiment of the invention.

Turning now to FIG. 6, the display frame 100 and kinetic artwork insert 140 of FIG. 2 have been prepared to use as an insert, for example in a plastic bag holding a magazine. In step 1, the kinetic artwork insert 140 is placed onto the upright member 102 of the unassembled display frame 100. In step 2, the base member 108 is then folded over to partially cover the kinetic artwork insert 140. In step 3, the upper support 106 is folded over to cover the base member 108 and the kinetic artwork insert 140. In this manner, the kinetic artwork insert 140 is protected by the folded base member 108 and upper support 106 of the display frame 100, and the entire assembly can be easily inserted into a plastic bag for distribution with a magazine, for example.

Figure 7A:
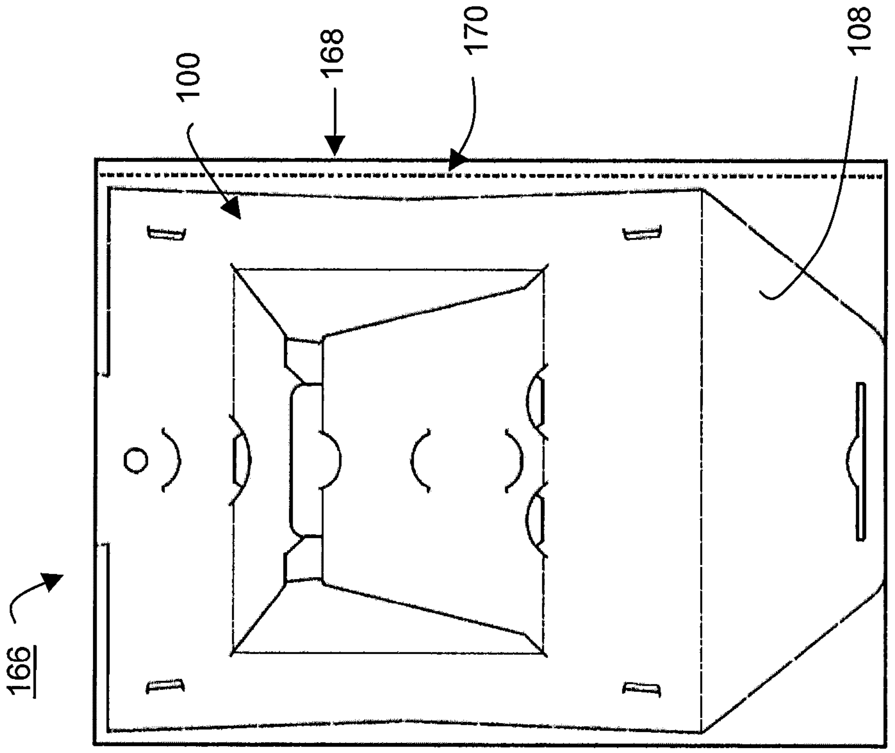
FIG. 7*a* is a plan view of an unassembled display frame for use with the kinetic artwork insert of FIG. 7.
Figure 7:
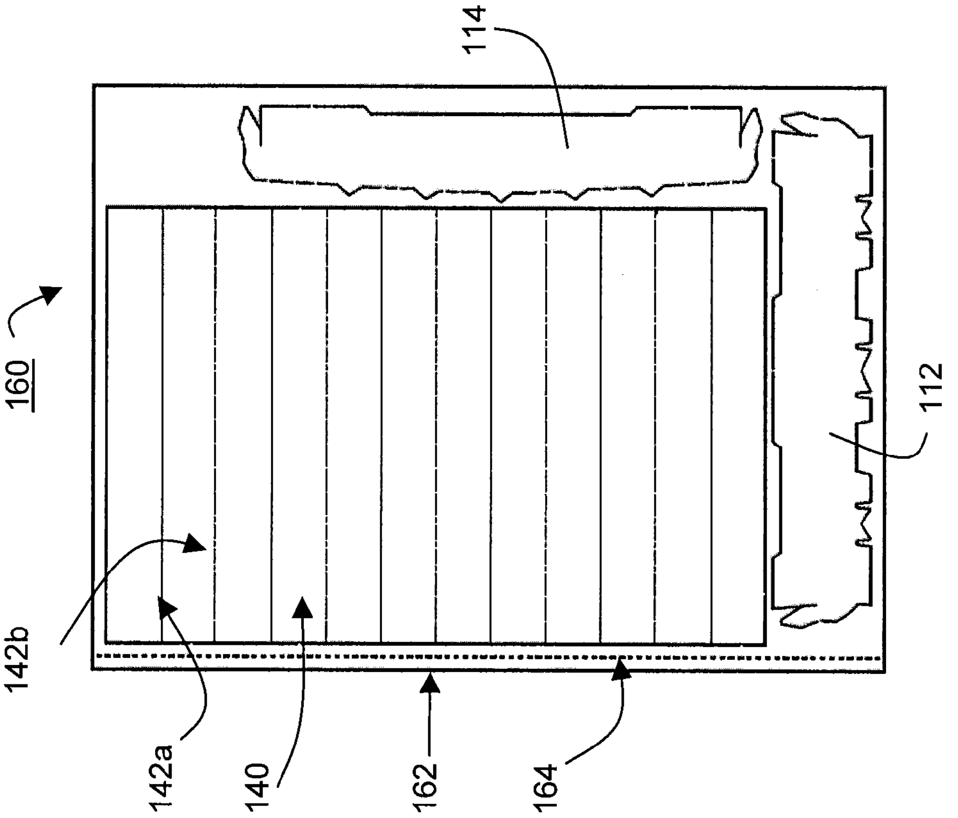
FIG. 7 is a plan view of an unassembled kinetic artwork insert according to another embodiment of the invention.

FIGS. 7 and 7*a* show a different embodiment of the invention for use as a detachable part of a book or magazine. For clarity, the same reference numerals are used to designate elements analogous to those described above in connection with FIGS. 1 to 5. The kinetic artwork insert 140 is included as part of an insert sheet 160 in such a way that it can be easily detached by providing perforated cut lines along the edges of the kinetic artwork insert 140. The upper band 114 and a lower band 112 are also included in the insert sheet 160 in a similar manner, and are easily removed. The kinetic artwork insert 140 shown in FIG. 7 has different types of parallel fold lines, included scored fold lines 142*a*, and perforated fold lines 142*b*. For the scored fold lines 142*a*, the sheet material of the kinetic artwork insert 140 has been creased but has not been perforated, while the perforated fold lines 142*b* comprise a series of cuts or holes passing through the material of the kinetic artwork insert 140. The combination of scored fold lines 142*a* and perforated fold lines 142*b* provides for improved folding.

The image sheet 160 is designed to be attached to a book or a magazine, using a spine edge 162, which is connected to the insert sheet 160 along tear line 164.

The display frame 100 shown in FIG. 7*a* is similarly included as part of a frame sheet 166, and the display frame 100 is provided with perforated cut lines along the edges to allow for easy removal. In this particular embodiment, the display frame 100 comprises generally an upright member 102 and a base member 108, with rear support flap 118, but has no upper support. Optionally, however, the frame sheet 166 may include an upper support 106.

The frame sheet 166 is designed to be attached to a book or magazine, using a second spine edge 168, which is connected along tear line 170.

Figure 7B:
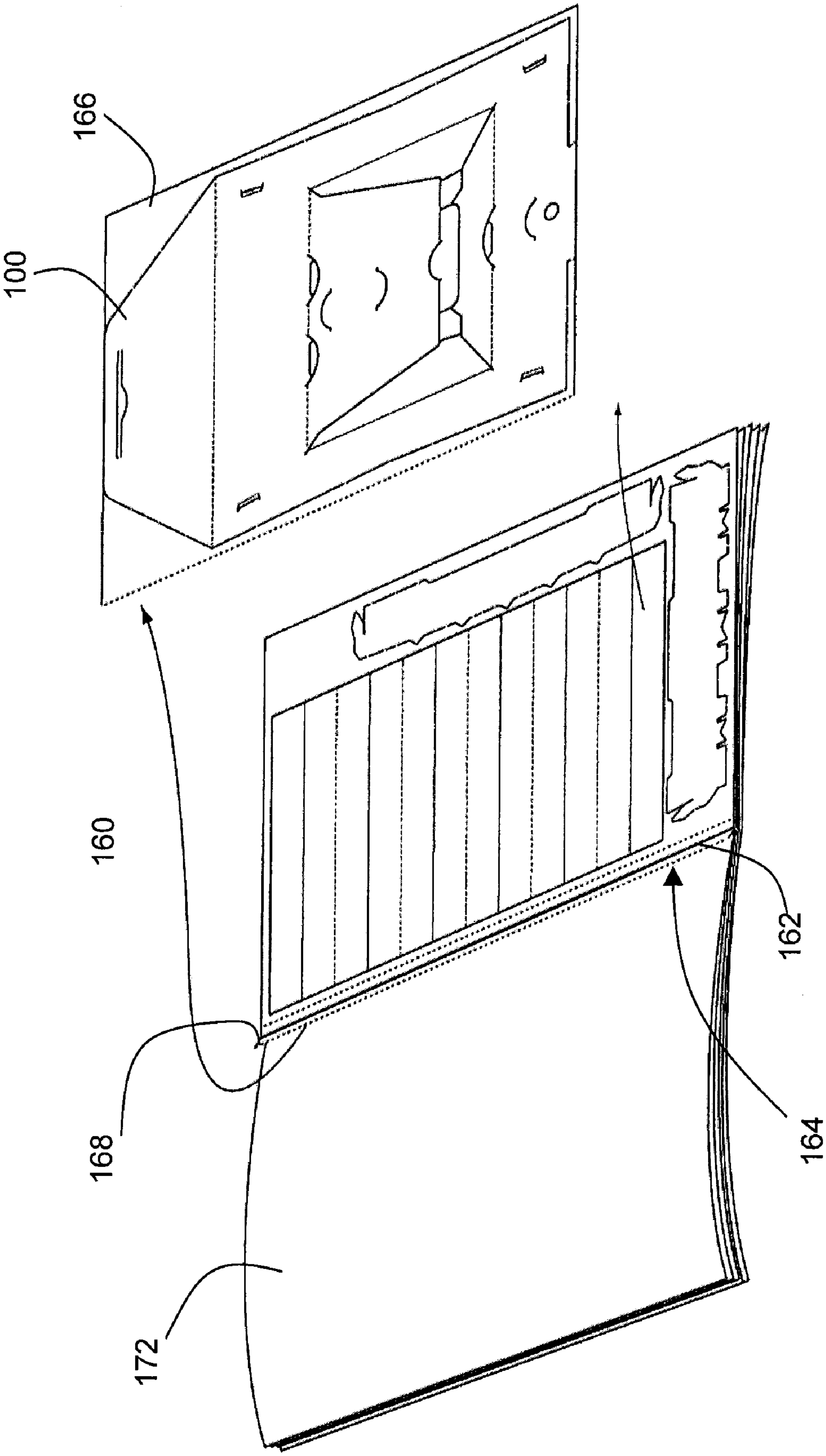
FIG. 7*b* is an exploded perspective view of a book with the display frame of FIG. 7*a* and the kinetic artwork insert of FIG. 7 attached.

As shown in FIG. 7*b*, the spine edges 162, 168 are joined with other pages in a book or magazine 172 using a typical binding process, for example by gluing or by stapling, to secure the image sheet 160 and the frame sheet 166 as part of the magazine 172. In one embodiment, the frame sheet 166 and image sheet 160 can be made from one large sheet, and be stapled at the centre of a book or magazine.

During assembly, the frame sheet 166 and image sheet 160 are removed from the book or magazine along the tear lines 164, 170. The individual components such as the display frame 100 can then be removed using the perforated cut lines, and assembled. It will be appreciated that the shapes and sizes of the image sheet 160 and the frame sheet 166 may be adjusted to accommodate books and magazines of different shapes and sizes.

In some embodiments of the invention, the book or magazine may include one or more sticker sheets having one or more images, which can be peeled off and mounted onto the kinetic artwork insert.

Figure 8A:
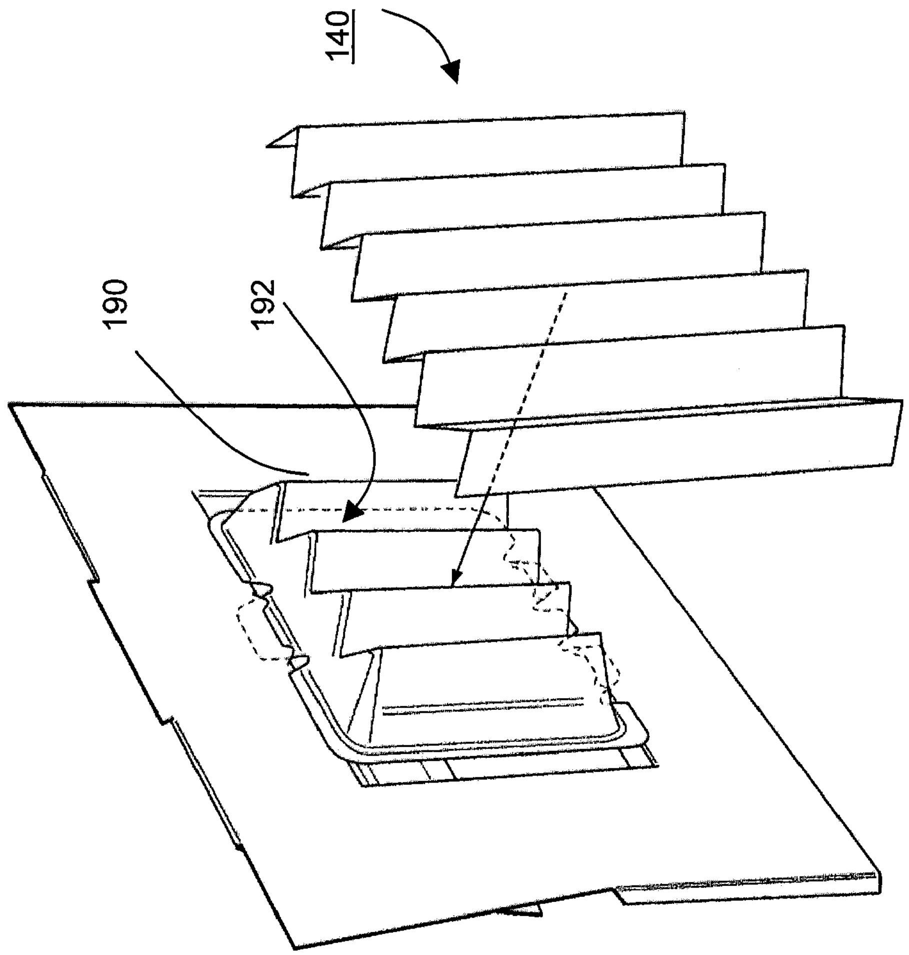
FIG. 8*a* is a perspective view of a kinetic artwork insert for mounting on the supporting insert of FIG. 8.
Figure 8:
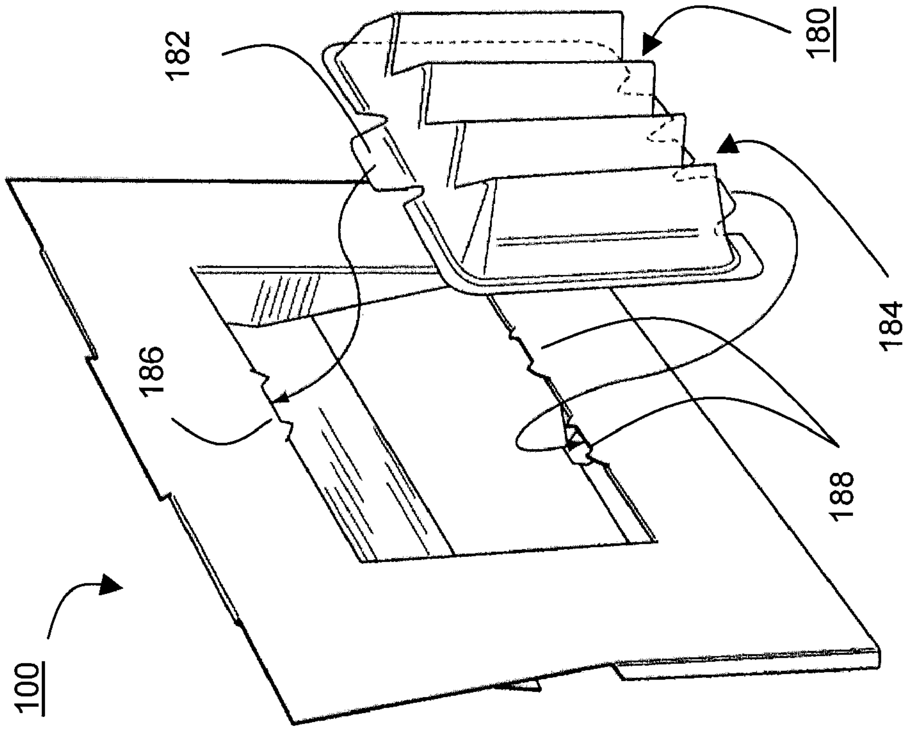
FIG. 8 is a perspective view of a display frame having a supporting insert according to another embodiment of the invention.

FIGS. 8, 8*a*, 9 and 9*a* show yet another embodiment of the invention. For clarity, the same reference numerals are used to designate elements analogous to those described above in connection with FIGS. 1 to 7*b*. As shown in FIGS. 8 and 8*a*, a shaped insert 180 is used to support the kinetic artwork insert 140 on the display frame 100. The shaped insert 180 resists deformation to support the kinetic artwork insert 140 in the non-planar or accordion-like configuration. In one embodiment, the shaped insert 180 is molded. The insert 180 has an upper tab 182 and a pair of lower tabs 184, for engagement with an upper slot 186 and a pair of lower slots 188, respectively, on the display frame 100. The insert 180 further comprises a series of peaks 190 and valleys 192, generally at angle θ relative to each other, and spaced to engage with the kinetic artwork insert 140 when in its non-planar display configuration.

In this embodiment, the insert 180 replaces the upper and lower bands 112, 114 in the above-described embodiments, secures the kinetic artwork insert 140 to the display frame 100, and ensures the kinetic artwork insert 140 remains in its non-planar display configuration. In some embodiments, the kinetic artwork insert 140 is releasably attachable to the insert 180 to allow different kinetic artwork inserts 140 to be used with the same insert 180. In some embodiments, the kinetic artwork insert 140 may be secured to the insert 180 using tape, sticky wax, or some other releasable means. The kinetic artwork insert 140 may also be glued to the insert 180 to provide a more permanent bond.

The insert 180 is preferably made from a generally lightweight, rigid material, for example a lightweight plastic or foam, cardboard or paper, or any other suitable material, such that it can secure the kinetic artwork insert 140 in its non-planar form to the upright member 102 without causing the display frame 100 to tip.

Figure 9:
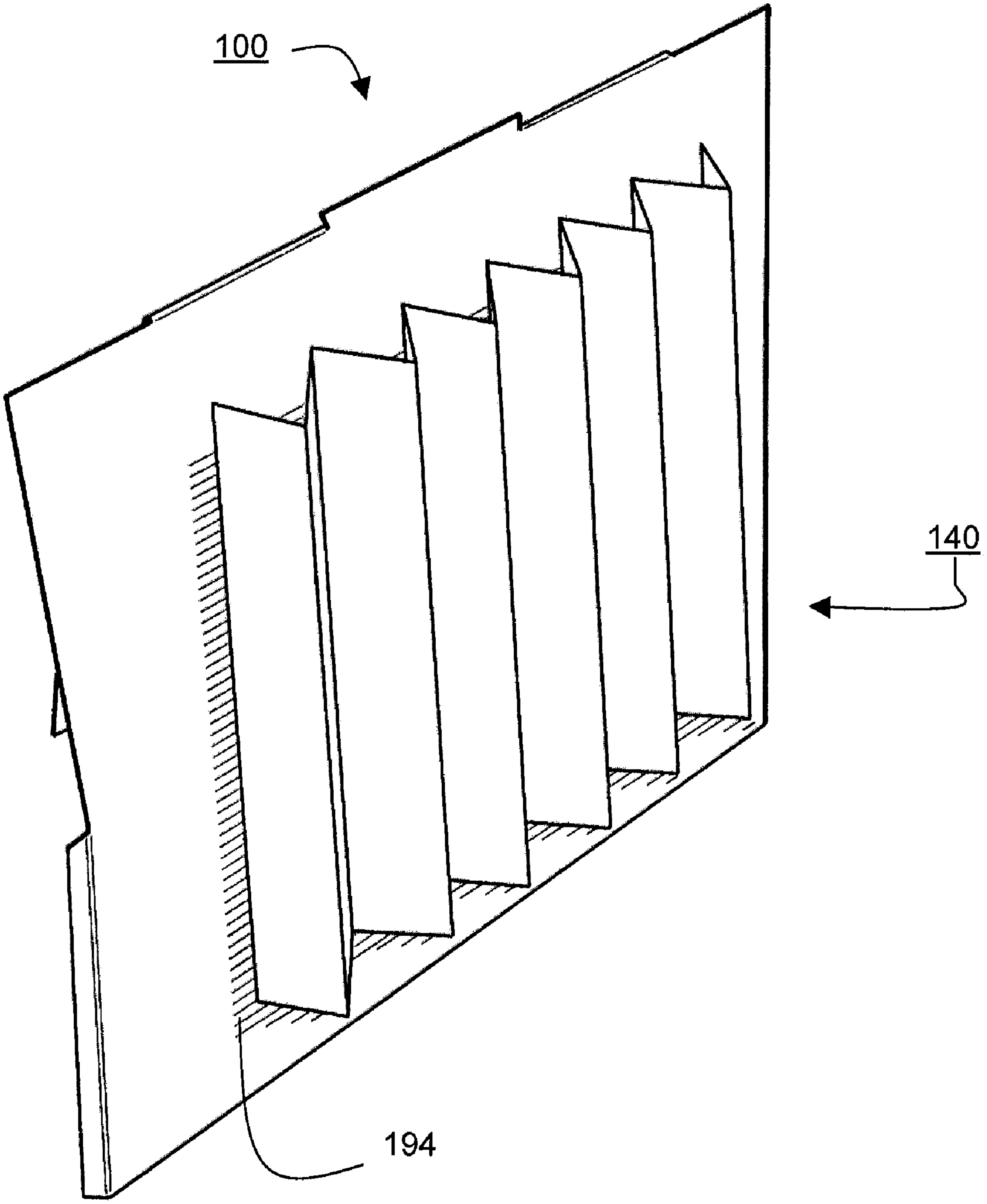
FIG. 9 is a perspective view of the kinetic artwork insert of FIG. 8*a* mounted to the display frame of FIG. 8.
Figure 9A:
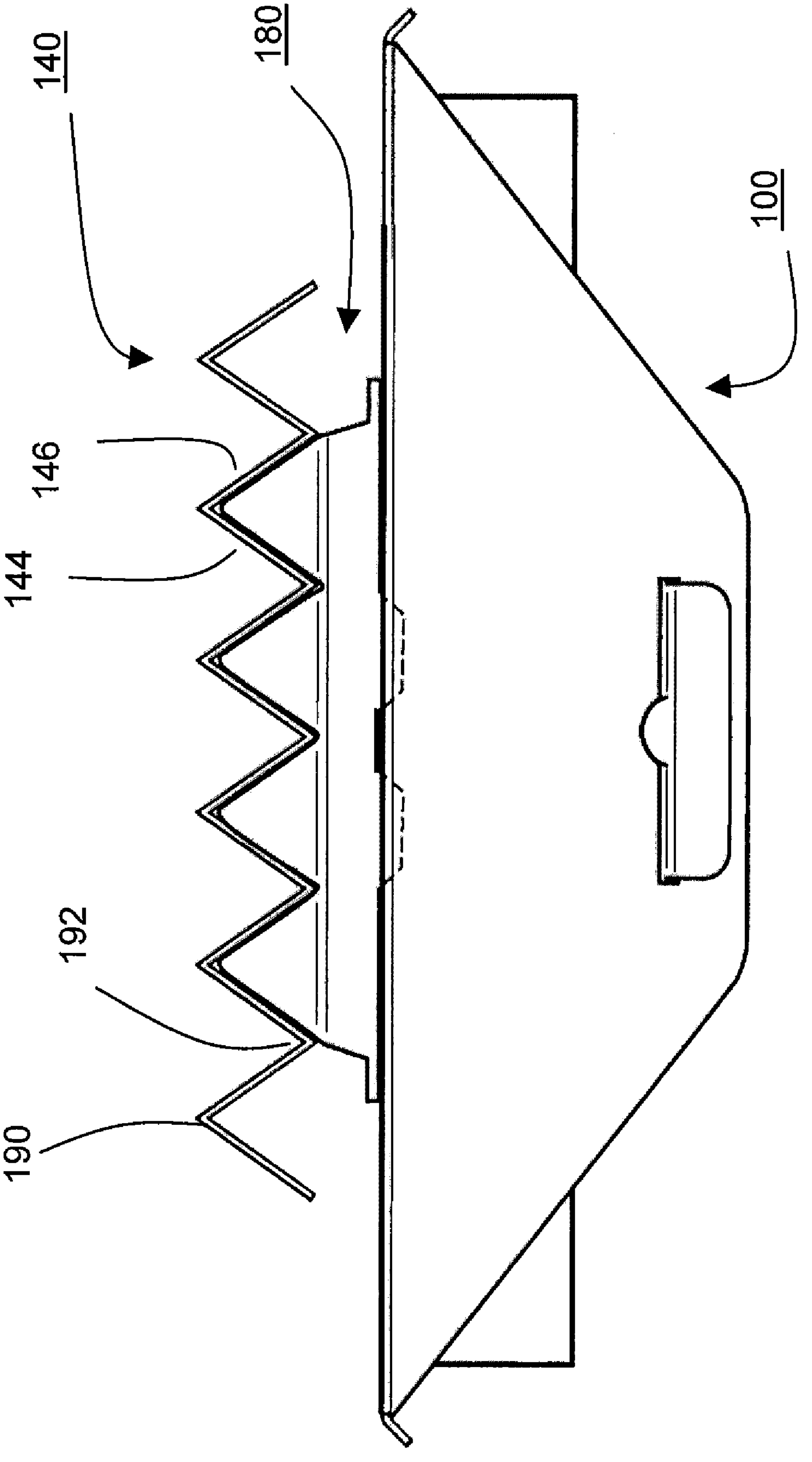
FIG. 9*a* is a bottom view of the kinetic artwork insert and display frame shown in FIG. 9.

With reference specifically to FIG. 9*a*, peaks 190 and valleys 192 of the insert 180 are clearly shown, engaged with the first image surfaces 144 and second image surfaces 146 on the kinetic artwork insert 140 to project the kinetic artwork insert 140 away from the upright member 102. In this fashion, the kinetic artwork insert 140 appears to the viewer to float in front of the upright member 102 while still maintaining the non-planar display configuration that facilitates perception of the first and second images by a viewer. In addition, a shadow 194 may be created around the kinetic artwork insert 140, which can further emphasize the images. Further, light passing through the opening 110 in the display frame 100 may create a halo effect around the kinetic artwork insert 140, further highlighting the images.

Turning now to FIGS. 10, 10*a* and 10*b*, there is illustrated a display frame 200 designed for use with the insert 180 discussed above, according to another embodiment. The display frame 200 comprises an upright member 202 having a generally curved shape such that no base member is needed to support the upright member 202 in an upright position, as best seen in FIG. 10*b*. Support fins 204 may optionally be present to provide additional stability.

The display frame 200 has a flat region 206, having an upper hook 208 and a pair of lower hooks 210, spaced and arranged to engage with the upper tab 182 and the lower tabs 184 on the insert 180. Thus, a kinetic artwork insert 140 can be mounted to display frame 200 using the insert 180.

The display frame 200 is made of a generally rigid material, such as a hard plastic or a metal. In preferred embodiments, the display frame 200 is made from a brushed aluminum or a stainless steel.

Reference is now made to FIGS. 11 to 17, which illustrate another embodiment of a display frame 300 for use with an image insert, for example the kinetic artwork display 140 discussed above. The display frame 300 comprises an interlocking mechanism 302, notches 316, and a rear support insert 318. Display frame 300 is substantially similar to display frame 100, except as discussed below. Like parts are identified by like reference numbers and will not be further described except as material.

In some embodiments, the display frame 300 can be used to display an image insert (not shown) that is a substantially planar image. For example, the image insert may be a photograph, or an image for display placed on a layer of slightly curved or substantially flat or unbent material. The abutment structure of the display frame 300 can be altered appropriately so as to support the planar or non-bendable image insert for display. For example, an upper band 314 and a lower band 312 of the abutment structure can comprise slits for engaging and securing the image insert in the display frame 300. In other embodiments, the image insert may be the bendable kinetic artwork display 140 discussed above.

Figure 11:
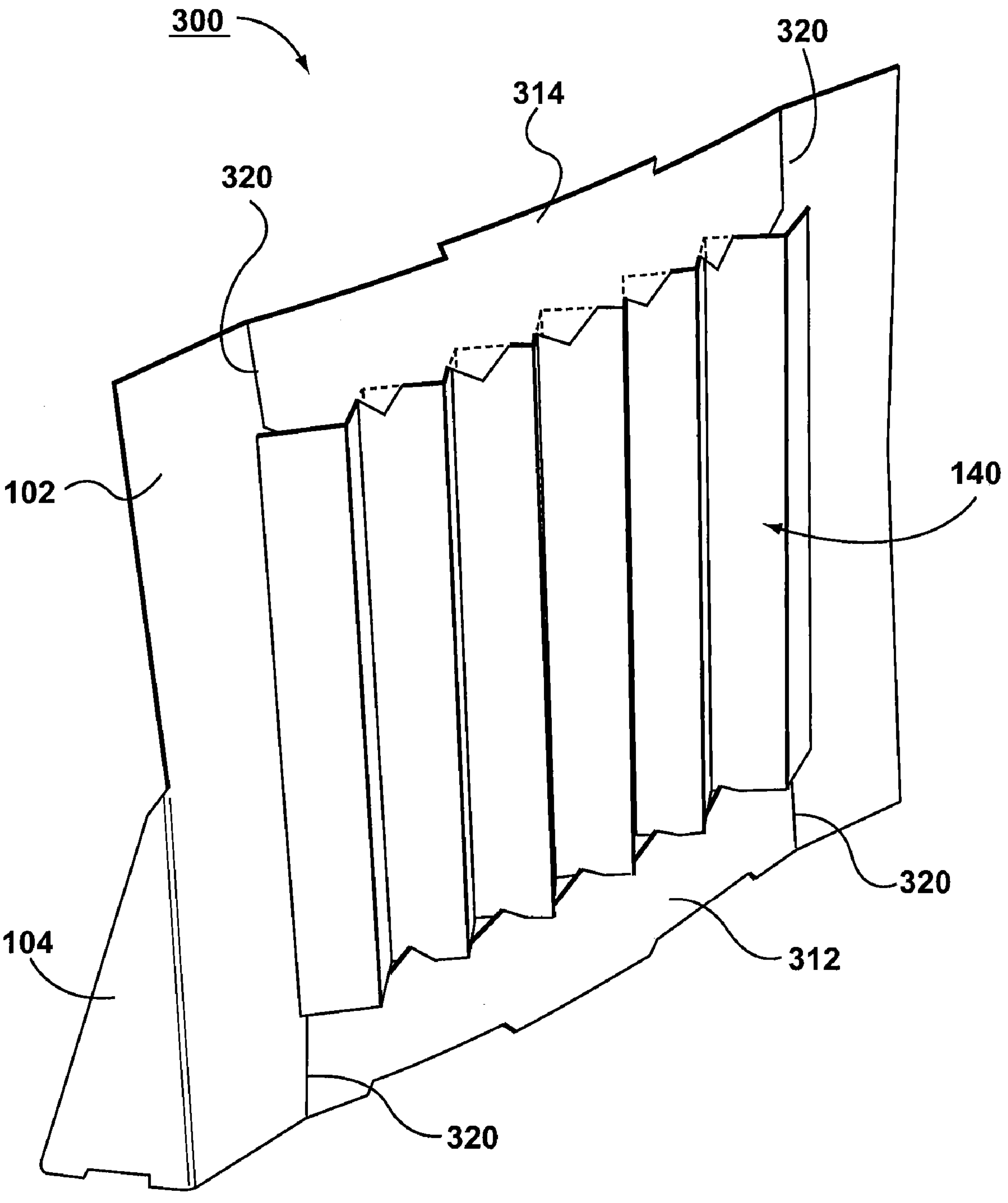
FIG. 11 is a front perspective view of an assembled display frame with a kinetic artwork insert according to another embodiment of the invention.
Figure 12A:
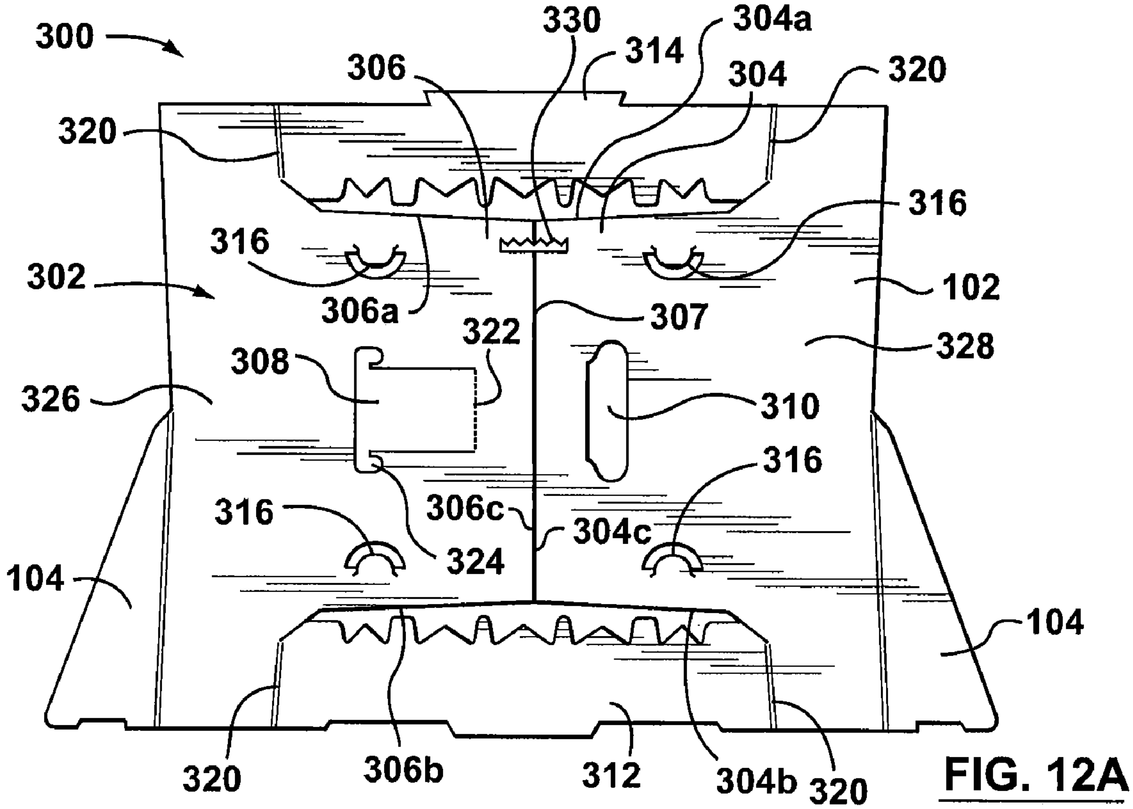
FIG. 12A is a plan view of the unassembled display frame of FIG. 11.
Figure 12B:
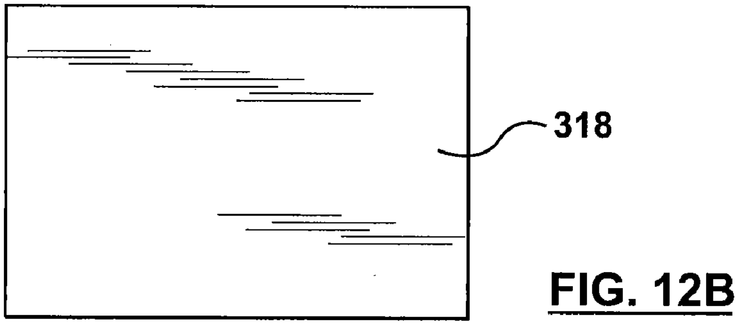
FIG. 12B is a plan view of an optional support insert for use with the display frame of FIG. 11.
Figure 12C:
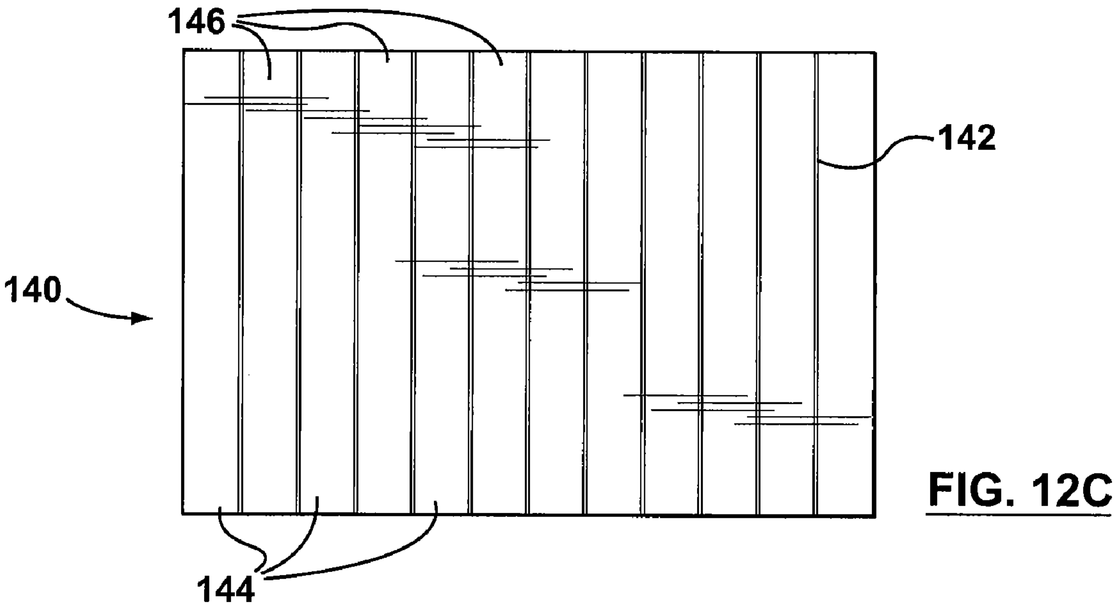
FIG. 12C is a plan view of a kinetic artwork insert in a planar configuration for use with the display frame of FIG. 11.

In the embodiments shown in FIG. 11-12(*a*), the abutment structure comprises the lower band 312 and upper band 314. In display frame 300, the lower band 312 and upper band 314 are similar to the lower band 112 and upper band 114 in the display frame 100. The lower band 312 and the upper band 314 are foldable around fold lines 320 at the first connection member 306 and a second connection member 304, such that the portions of the lower band 312 and the upper band 314 between fold lines 320 bow outwardly when the first connection member 306 and the second connection member 304 are locked in an interlocked position as will be described in more detail below. This permits the first connection member 306 and the second connection member 304 to operably support the abutment structure in a fashion similar to the upright member 102 operably supporting the abutment structure in display frame 100.

The first connection member 306 and the second connection member 304 are both part of the upright member 102. Optionally, the first connection member 306 and the second connection member 304 can have slits cut in them that align to form a wall mount aperture 330, suitable for hanging on a peg on a wall, to hang the display frame against the wall. The lower band 312 and upper band 314 can curve outward somewhat from the plane of the upright member 102 by pivoting about fold lines 320. In the embodiments of FIG. 11, fold lines 320 are located at the ends of both the lower band 312 and the upper band 314. Typically, the lower band 312 and the upper band 314 are planar when the display frame 300 is in a first substantially planar state, and curve outwardly when the display frame 300 is in a second non-planar display state.

Figure 15A:
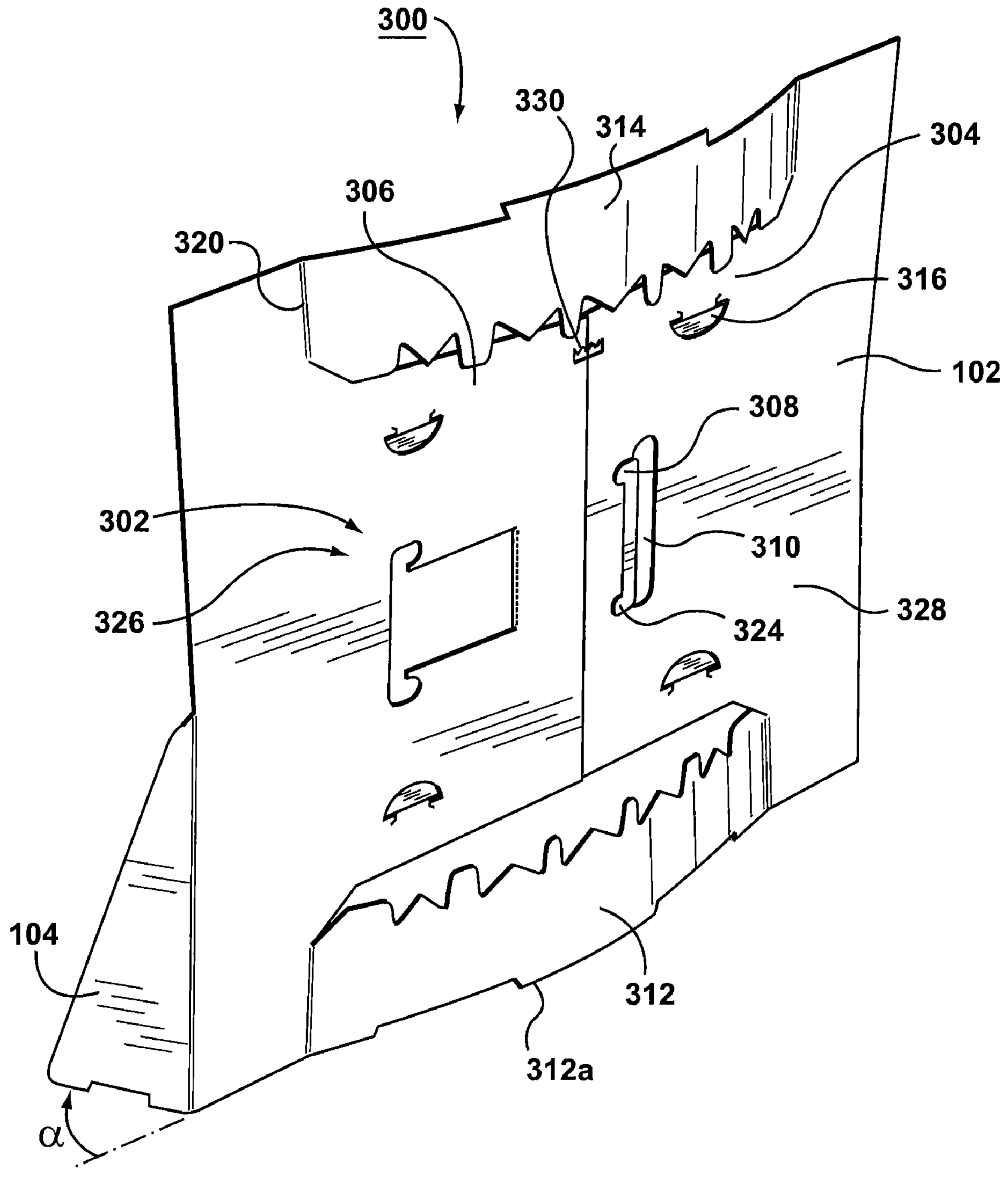
FIG. 15A is a front perspective view of the assembled display frame from FIG. 14A.
Figure 15B:
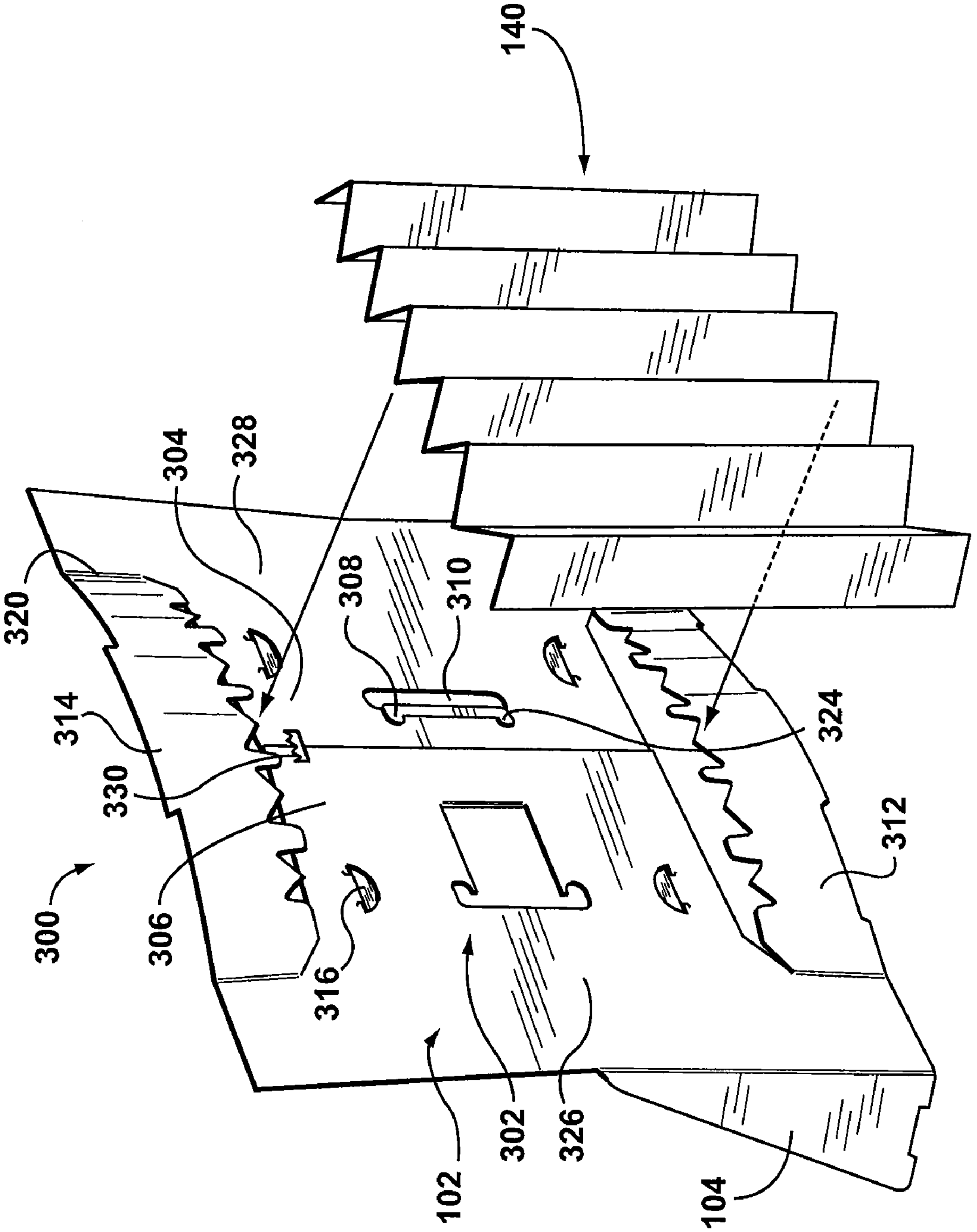
FIG. 15B is a front perspective view of a kinetic artwork insert for mounting on the assembled display frame from FIG. 11.
Figure 15C:
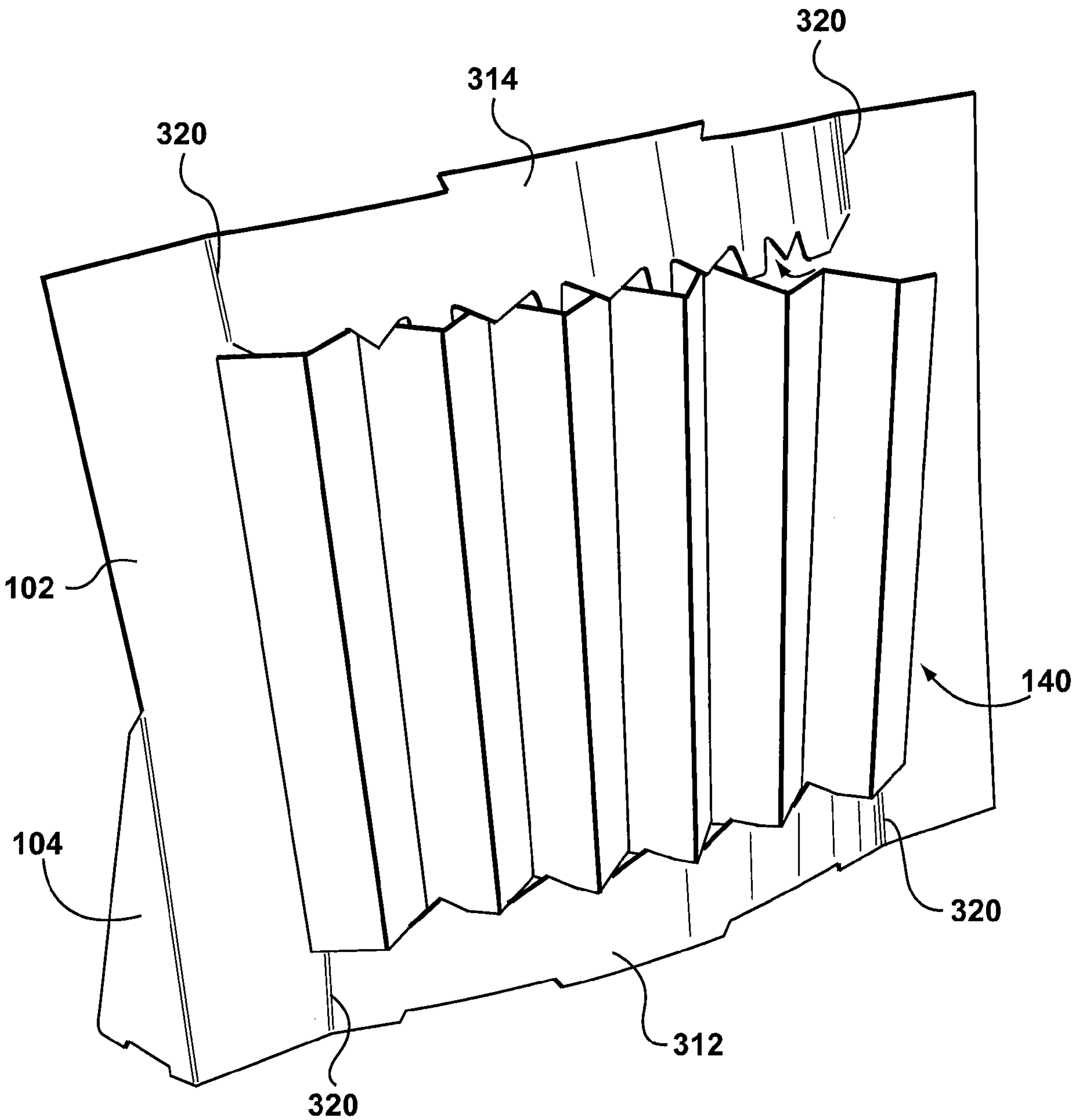
FIG. 15C is a front perspective view of an assembled display frame from FIG. 15A with the kinetic artwork insert from FIG. 15B partly mounted therein.
Figure 16:
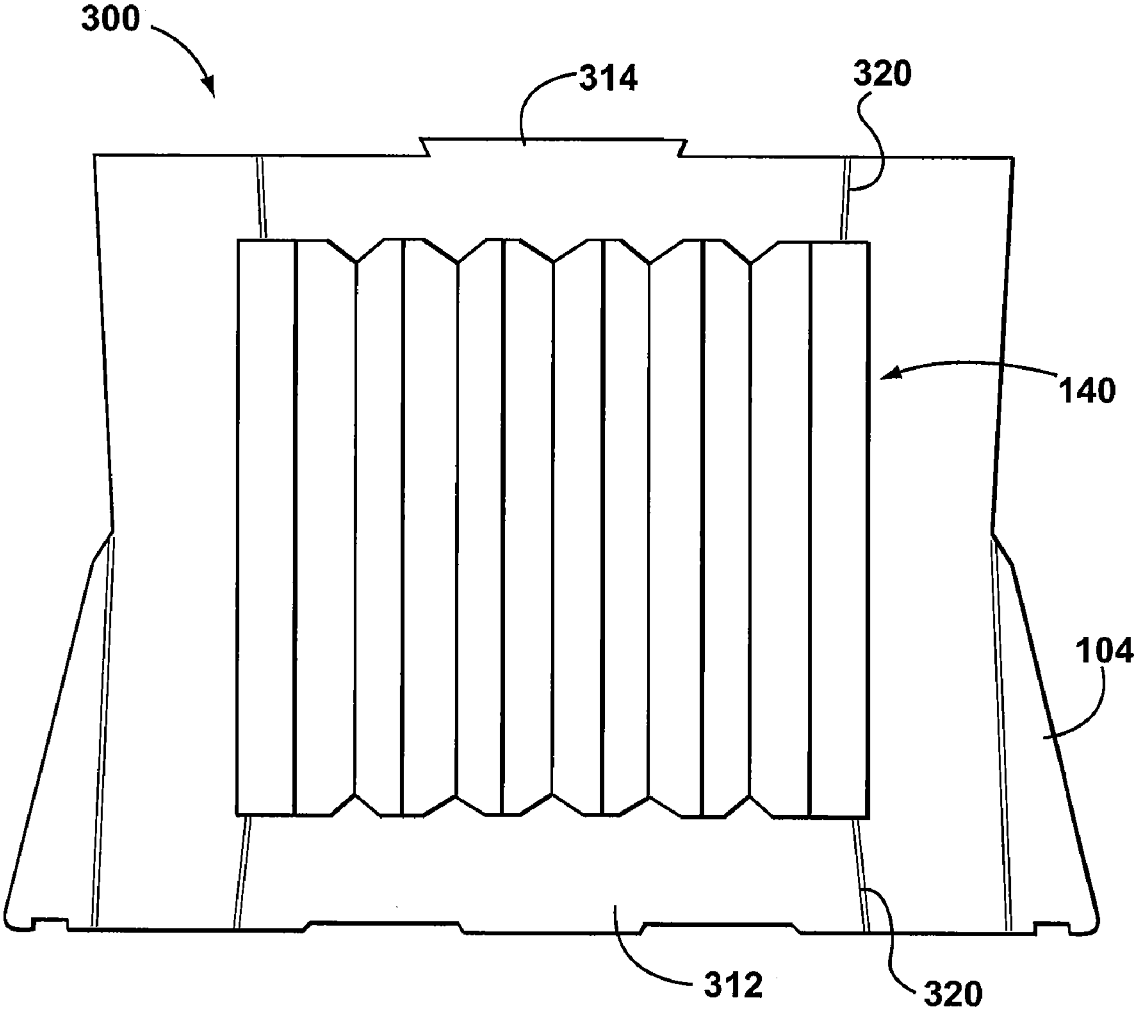
FIG. 16 is a front plan view of the assembled display frame and kinetic artwork insert from FIG. 15A.
Figure 17:
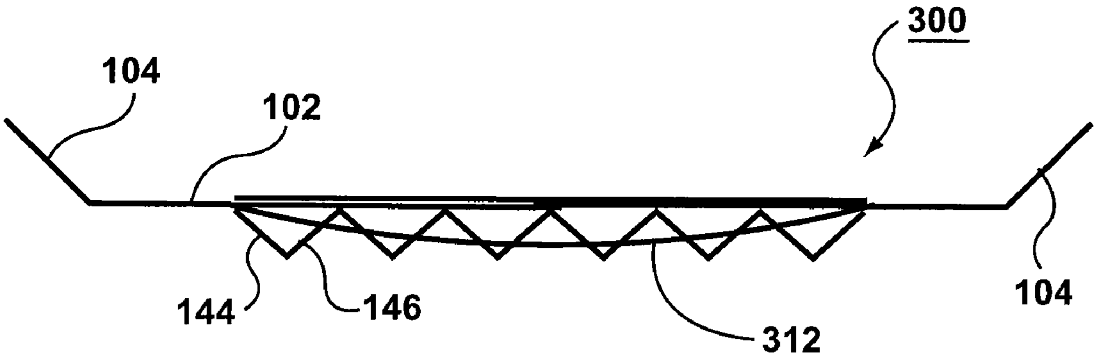
FIG. 17 is a bottom view of the assembled display frame and kinetic artwork insert from FIG. 16.

The support fins 104 of the display frame 300 can be slightly larger than the support fins of the display frame 100, or 200. The larger size of the support fins 104 in the display frame 300 can provide the upright member 102 with additional support to further impede tipping of the display frame 300. When the display frame 300 is in the first substantially planar state, as shown in FIG. 12A, the support fins 104 can be substantially parallel to (or in) the plane of the upright member 102. As shown in FIG. 15A, when the display frame 300 is in the second non-planar display state the support fins 104 can be at a generally non-zero angle α relative to the plane of the upright member 102.

Figure 13:
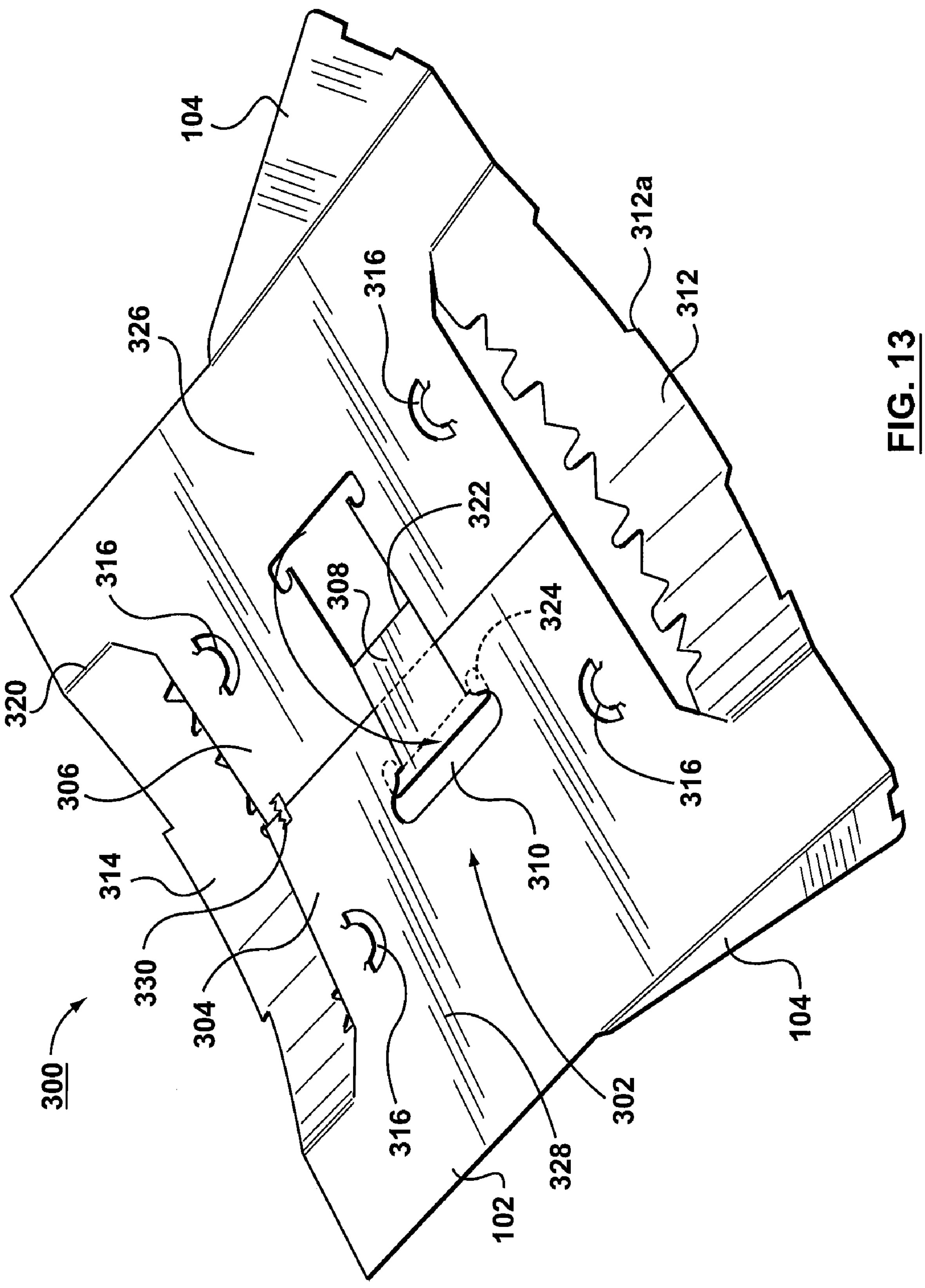
FIG. 13 is a rear perspective view of a partly assembled display frame of FIG. 11.

In addition as shown in FIGS. 13 and 15A, when the display frame 300 is in the second non-planar display state, the lower band 312 can be configured to curve outwardly from the plane of the upright member 102, providing additional support to impede the display frame 300 from tipping. In one embodiment, the support fins 104 and the lower band 312 rest on a substantially horizontal surface to support the display frame at a substantially vertical orientation. The lower band 312 can also comprise a support edge 312*a* for resting on the substantially horizontal surface. Some example horizontal surfaces include a table or a desk.

As shown in FIGS. 12A and 13, the interlocking mechanism 302 typically includes a first connection member 306, a second connection member 304, a male member 308, and a female member 310. The first connection member 306 is integrally attached to the rest of upright member 102 at a first side 326, and unattached to the rest of upright member 102 at a centerline 307 adjacent to the second connection member 304. In addition, the first connection member 306 is unattached to the rest of upright member 102 at a top side 306*a* adjacent to the upper band 314, and at a bottom side 306*b* adjacent to the lower band 312. Similarly, the second connection member 304 is integrally attached to the rest of upright member 102 at a second side 328, and unattached to the rest of upright member 102 at centerline 307 adjacent to the first connection member 306. In addition, the second connection member 304 is unattached to the rest of upright member 102 at a top side 304*a* adjacent to the upper band 314, and at a bottom side 304*b* adjacent to the lower band 312.

As shown in FIG. 12A, in the first substantially planar state a side 306*c* of the first connection member 306 adjacent to the second connection member 304 abuts the second connection member 304, forming a substantially planar sheet. In the second non-planar display state side 306*c* of the first connection member 306 overlaps the second connection member 304 at a side 304*c*. The overlapping of the first connection member 306 and the second connection member 304 contracts the upright member 102 to cause the upper band 314 and the lower band 312 to curve outward from the plane of the upright member 102.

Unless interconnected or interlocked in place, typically the display frame 300 resiliently returns from the second non-planar display state to the first substantially planar state. In some embodiments, this is a result of the resilient nature of the material and structure of any of: the first connection member 306; second connection member 304; the upper band 314; and the lower band 312.

For some embodiments, the male member 308 is integrally attached on the first connection member 306, and the female member 310 is cut into the second connection member 304. In some embodiments, the male member 308 is a rectangular key detachable from the first connection member 306 on all sides except fold line 322 at which the male member remains attached to the first connection member 306. The male member 308 is typically foldable around fold line 322 relative to the first connection member 306. In some embodiments, the female member 310 comprises an aperture cut into the second connection member 304, where the aperture is dimensioned to receive the male member 308, such that the male member 308 can interlock with the female member 310. In addition, in some embodiments the male member 308 comprises flanges 324 adapted to catch on an edge of the female member 310. Flanges 324 tend to be held against the edge of the female member 310 by the natural resiliency of the upright member 102. Alternatively, other retaining mechanisms can be used instead of the flanges 324 and edge of the female member 310 shown in the drawings. For example, a tight friction-fit might be used. As shown in FIG. 12A, when the display frame 300 is in the first substantially planar state the male member 308 is typically parallel with a plane defined by the first connection member 306, which itself is in the same plane as the second connection member 304 or the upright member 102 at that stage.

As shown in FIGS. 13 and 15A, when the display frame 300 is in a second non-planar display state, the male member 308 is typically folded around fold line 322 and interlocked with the female member 310. This involves flanges 324 catching on the edge of the female member 310 to retain male member 308 within female member 310, to interlock the interlocking mechanism 302. In some embodiments the display frame 300 can be selectively changed between the first substantially planar state and the second non-planar display state, by interlocking or uninterlocking the male member 308 and female member 310.

Figure 14A:
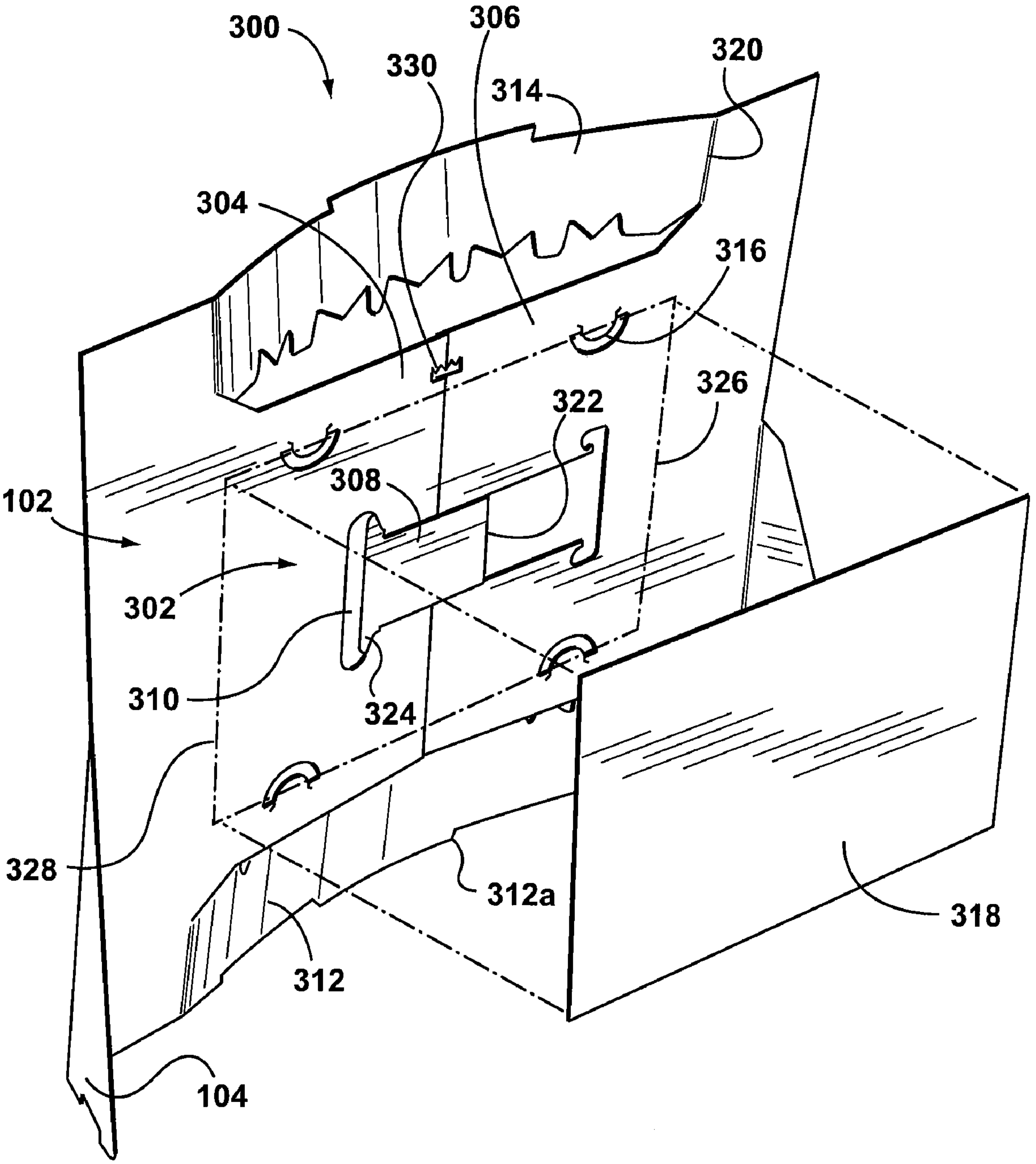
FIG. 14A is a rear perspective view of the partly assembled display frame from of FIG. 13, and the optional support insert for use with the display frame from FIG. 12B.
Figure 14B:
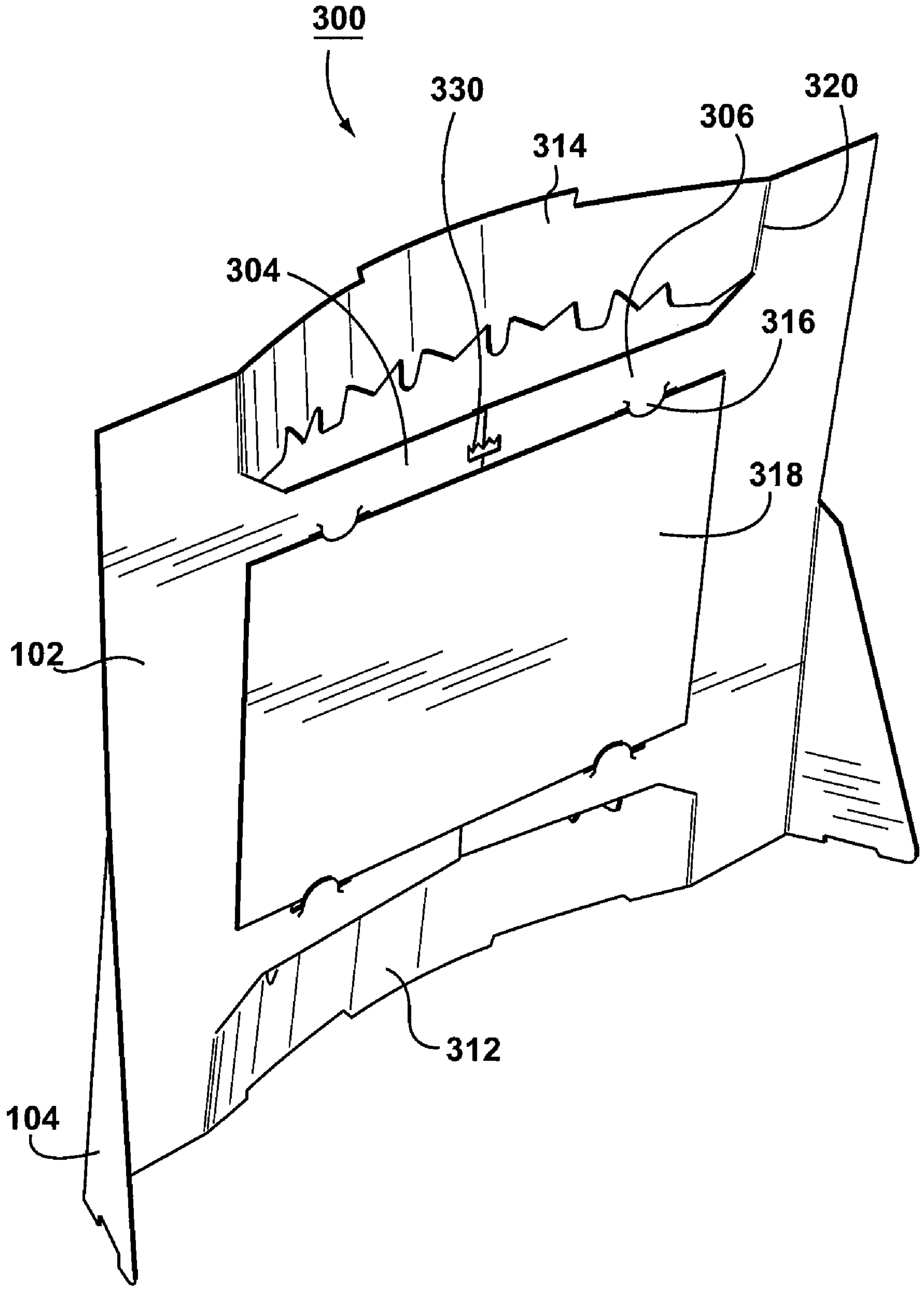
FIG. 14B is a rear perspective view of the assembled display frame from FIG. 14A.

As described above, in some embodiments the display frame 300 also comprises a support insert 318, as shown in FIG. 12B. As shown in FIGS. 14A and 14B, the support insert 318 can be attached to the backside of the display frame 300 when the display frame 300 is in the second non-planar display state. The support member 318 can help maintain the upright member 102 in an upright state to maintain the kinetic artwork insert 140 in proper position for viewing.

As shown in FIGS. 14A, 14B and 15A, the support insert 318 can be attached to the backside of the display frame 300 via a plurality of notches 316 adapted to selectively interlock with the support insert 318 when the display frame 300 is in the second non-planar display state. In one example, four notches 316 are positioned in a generally rectangular shape, with two formed in the first connection member 306 and two formed in the second connection member 304. The four notches 316 are positioned such that when the display frame 300 is in the second non-planar display state, a rectangular embodiment of the support insert 318 can engage the notches, and can thus attach to the display frame 300. The notches 316 may be replaced by any suitable means for attaching the support insert 318 to the display frame 300, such as, for example, a paperclip, an adhesive or the like.

As shown in FIGS. 11, 15B, 15C, 16, and 17, similar to display frame 100, and 200, once the display frame 300 is the second non-planar display state, the kinetic artwork insert 140 can be engaged with the display frame 300 in a fashion similar to that described above.

Optionally, the contoured support or shaped insert 180 described above in connection with FIGS. 8, 8(*a*), 9 and 9(*a*), may also be used in connection with the display frame 300. According to this variant of the invention, the insert 180 could replace the upper and lower bands 312, 314 described above or could be used in addition to the bands 312, 314.

As described above, both the display frame and the image insert may be part of a product such as a book having a plurality of pages. The book may be a magazine, having a soft cover, or may be other articles comprising a spine edge and a plurality of pages connected at the spine edge.

Other variations and modifications of the invention are possible. All such modifications or variations are believed to be within the sphere and scope of the invention as defined by the claims appended hereto.

The invention claimed is:

1. A display frame for supporting an image insert for display, the display frame comprising:
- an abutment structure for supporting the image insert for display;
- an upright member including a first connection member and a second connection member; and
- an interlocking mechanism for interlocking the first connection member and the second connection member; wherein
- the image insert is bendable from a planar configuration to a non-planar display configuration, wherein the image insert comprises a plurality of first surfaces for displaying a first image, and a plurality of second surfaces for displaying a second image;
- the abutment structure is configured to abut the plurality of first surfaces of the image insert and the plurality of second surfaces of the image insert to secure the plurality of first surfaces at a non-zero angle relative to the plurality of second surfaces and to resist unbending of the image insert and to support the image insert in a non-planar display configuration;
- the upright member has a first substantially planar state and a second non-planar display state, and is operable to support the abutment structure;
- the first connection member and the second connection member comprise a resilient material biased to return the upright member from the second non-planar display state to the first substantially planar state when not interlocked;
- the interlocking mechanism is operable to interlock the first connection member and the second connection member such that the upright member is in the second non-planar display state;
- the interlocking mechanism comprises:
  - a male member mounted on the first connection member; and
  - a female member for receiving the male member, the female member being mounted on the second connection member; wherein
  - the female member receives the male member to interlock the first connection member and the second connection member such that the upright member is in the second non-planar display state; and,
  - the male member comprises a flange for catching on an edge of the female member to interlock the first connection member and the second connection member such that the upright member is in the second non-planar display state;
- the abutment structure comprises a lower band mounted on the first connection member and the second connection member to curve outwardly when the display frame is in the second non-planar display state; and,
- the curved outwardly lower band is configured to rest on a substantially horizontal surface to support the display frame at a substantially vertical orientation.

2. The display frame as defined in claim 1 wherein the interlocking mechanism comprises a retainer for retaining the male member inside the female member.

3. The display frame as defined in claim 1 further comprising at least one support fin for resting on a substantially horizontal surface to support the display frame at a substantially vertical orientation.

4. The display frame as defined in claim 1 wherein the abutment structure comprises an upper band mounted on the first connection member and the second connection member to curve outwardly when the display frame is in the second non-planar display state.

5. The display assembly frame as defined in claim 1 further comprising a wall mount for receiving a projection from a wall to support the display assembly on the wall.

6. A display frame for supporting an image insert for display, the display frame comprising:

an abutment structure for supporting the image insert for display;

an upright member including a first connection member and a second connection member; and an interlocking mechanism for interlocking the first connection member and the second connection member; wherein the image insert is bendable from a planar configuration to a non-planar display configuration, wherein the image insert comprises a plurality of first surfaces for displaying a first image, and a plurality of second surfaces for displaying a second image;

the abutment structure is configured to abut the plurality of first surfaces of the image insert and the plurality of second surfaces of the image insert to secure the plurality of first surfaces at a non-zero angle relative to the plurality of second surfaces and to resist unbending of the image insert and to support the image insert in a non-planar display configuration;

the upright member has a first substantially planar state and a second non-planar display state, and is operable to support the abutment structure;

the first connection member and the second connection member comprise a resilient material biased to return the upright member from the second non-planar display state to the first substantially planar state when not interlocked;

the interlocking mechanism is operable to interlock the first connection member and the second connection member such that the upright member is in the second non-planar display state;

the interlocking mechanism comprises:

a male member mounted on the first connection member; and a female member for receiving the male member, the female member being mounted on the second connection member; wherein the female member receives the male member to interlock the first connection member and the second connection member such that the upright member is in the second non-planar display state; and, the male member comprises a flange for catching on an edge of the female member to interlock the first connection member and the second connection member such that the upright member is in the second non-planar display state; and, the abutment structure comprises a contoured support having a plurality of first support surfaces for orienting the plurality of first surfaces and a plurality of second support surfaces for orienting the plurality of second surfaces, wherein the plurality of first support surfaces are oriented at the non-zero angle relative to the plurality of second surfaces.

7. The display frame as defined in claim 6 wherein the contoured support is substantially rigid to resist bending of the plurality of first support surfaces relative to the plurality of second surfaces.

8. The display frame as defined in claim 7 wherein the contoured support is made of one of foam and plastic.

9. The display frame as defined in claim 1 further comprising a support insert attachable to a backside of the upright member when the upright member is in the second non-planar display state.

10. The display frame as defined in claim 1 further comprising a plurality of stickers, the plurality of stickers being shaped to match and be attachable to the plurality of first surfaces and the plurality of second surfaces of the image insert.

11. The display frame as defined in claim 10 wherein the plurality of stickers are configurable to display a first pre-printed image and a second pre-printed image.

12. The display frame as defined in claim 10 wherein each sticker in the plurality of stickers comprises a surface for receiving one of a portion of a first image and a portion of a second image.

13. The display frame as defined in 6 wherein the interlocking mechanism comprises a retainer for retaining the male member inside the female member.

14. The display frame as defined in claim 6 further comprising at least one support fin for resting on a substantially horizontal surface to support the display frame at a substantially vertical orientation.

15. The display frame as defined in claim 6 further comprising a support insert attachable to a backside of the upright member when the upright member is in the second non-planar display state.

16. The display frame as defined in claim 6 further comprising a plurality of stickers, the plurality of stickers being shaped to match and be attachable to the plurality of first surfaces and the plurality of second surfaces of the image insert.

17. The display frame as defined in claim 16 wherein the plurality of stickers are configurable to display a first pre-printed image and a second pre-printed image.

18. The display frame as defined in claim 16 wherein each sticker in the plurality of stickers comprises a surface for receiving one of a portion of a first image and a portion of a second image.

* * * * *